United States Patent
Deng et al.

(10) Patent No.: US 10,222,071 B2
(45) Date of Patent: Mar. 5, 2019

(54) OVEN SYSTEM WITH HEAT EXCHANGER

(71) Applicant: Hestan Commercial Corporation, Anaheim, CA (US)

(72) Inventors: Eric Deng, Irvine, CA (US); Chris Moy, Monterey Park, CA (US)

(73) Assignee: Hestan Commercial Corporation, Anaheim, CA (US)

( * ) Notice: Subject to any disclaimer, the term of this patent is extended or adjusted under 35 U.S.C. 154(b) by 213 days.

(21) Appl. No.: 14/992,667

(22) Filed: Jan. 11, 2016

(65) Prior Publication Data
US 2016/0201924 A1  Jul. 14, 2016

Related U.S. Application Data

(60) Provisional application No. 62/102,223, filed on Jan. 12, 2015.

(51) Int. Cl.
| | | |
|---|---|---|
| *B23P 19/00* | (2006.01) | |
| *F24C 15/20* | (2006.01) | |
| *F24C 15/32* | (2006.01) | |

(52) U.S. Cl.
CPC .......... *F24C 15/2007* (2013.01); *B23P 19/00* (2013.01); *F24C 15/322* (2013.01)

(58) Field of Classification Search
None
See application file for complete search history.

(56) References Cited

U.S. PATENT DOCUMENTS

| | | | | |
|---|---|---|---|---|
| 3,150,655 A | * | 9/1964 | Saponara | F24C 15/006 126/21 R |
| 3,417,742 A | * | 12/1968 | Perl | F24C 14/025 126/21 A |
| 3,499,430 A | * | 3/1970 | Kemp | F24C 14/02 126/21 R |
| 3,667,450 A | * | 6/1972 | Skafte | F24C 3/027 126/39 D |
| 3,682,156 A | * | 8/1972 | Perl | F24C 14/025 126/21 A |
| 3,782,360 A | * | 1/1974 | Brucken | F24C 14/02 126/19 R |
| 3,951,335 A | * | 4/1976 | Kemp | F23N 1/067 236/15 A |
| 3,990,433 A | * | 11/1976 | Keating | A47J 37/1247 126/391.1 |
| 4,375,802 A | * | 3/1983 | Wallasvaara | F24C 1/16 126/21 A |
| 6,718,965 B2 | * | 4/2004 | Rummel | F24C 15/322 126/21 A |
| 6,723,970 B1 | * | 4/2004 | Whipple, Jr. | F24C 15/2007 126/21 A |

(Continued)

*Primary Examiner* — Avinash A Savani
*Assistant Examiner* — Martha M Becton
(74) *Attorney, Agent, or Firm* — Akerman LLP

(57) ABSTRACT

An oven system may include a cooking chamber, a combustion chamber, and a flue. The flue may be arranged to route a first portion of the combustion gas produced in the combustion chamber into the cooking chamber and route a second portion of the combustion gas along a route that bypasses the cooking chamber. The flue may also be arranged to collect the first portion of the combustion gas from the cooking chamber and to exhaust both the first portion and the second portion of the combustion gas from the oven system.

28 Claims, 9 Drawing Sheets

(56) References Cited

U.S. PATENT DOCUMENTS

| | | | | |
|---|---|---|---|---|
| 7,422,009 B2* | 9/2008 | Rummel | ............... | F24C 15/322 |
| | | | | 126/21 A |
| 8,955,506 B2* | 2/2015 | Murray | ............... | F24C 15/322 |
| | | | | 126/21 A |
| 9,568,200 B2* | 2/2017 | Moon | ................... | F24C 15/322 |
| 2003/0140917 A1* | 7/2003 | Rummel | ............... | F24C 15/322 |
| | | | | 126/21 A |
| 2006/0130824 A1* | 6/2006 | Rummel | ............... | F24C 15/322 |
| | | | | 126/21 A |
| 2006/0137675 A1* | 6/2006 | Kim | ..................... | F24C 15/001 |
| | | | | 126/21 A |
| 2012/0192853 A1* | 8/2012 | Binzer | ................ | F24C 15/002 |
| | | | | 126/512 |
| 2014/0137853 A1* | 5/2014 | Murray | ............... | F24C 15/322 |
| | | | | 126/21 A |
| 2014/0174426 A1* | 6/2014 | Moon | ................... | F24C 15/322 |
| | | | | 126/21 A |
| 2015/0122242 A1* | 5/2015 | Murray | ............... | F24C 15/322 |
| | | | | 126/21 A |
| 2016/0327283 A1* | 11/2016 | Lee | ........................ | F24C 3/124 |

* cited by examiner

OVEN SYSTEM WITH HEAT EXCHANGER

CROSS-REFERENCE TO RELATED APPLICATIONS

This patent application claims priority under 35 U.S.C. § 119(e) to U.S. Provisional Patent Application No. 62/102,223 filed on Jan. 12, 2015, entitled "Gas Oven with Heat Exchanger," which is hereby incorporated by reference in its entirety.

TECHNICAL FIELD

The present disclosure relates to ovens. More specifically, the present disclosure relates to heating ovens and routing combustion gas produced by combustion of fuels used to heat ovens.

BACKGROUND

Various methods have been used to heat cooking chambers of ovens. One such method entails transferring heat generated by combustion of combustible fuels to the cooking chamber. The fuel is generally combusted in a combustion chamber that is located adjacent to the cooking chamber. In a common application, the combustion chamber will be located below the cooking chamber to take advantage of the thermal rise that accompanies the relatively low density hot gas produced during combustion. The hot gas may directly or indirectly heat the walls of the cooking chamber. For example, hot gas produced in the combustion chamber may directly heat a wall of the combustion chamber and thereafter escape the oven via a flue. The wall then radiates the heat to the adjacent cooking chamber, which is generally located along a common wall. Instead of directly exhausting the gas from the combustion chamber through the flue, some ovens route the hot gas through the cooking chamber prior to exhausting it through the flue.

SUMMARY

In one aspect, an oven system comprises a cooking chamber, a combustion chamber, and a flue. The flue may include a combustion chamber collection portion comprising one or more collection ports positioned to receive combustion gas produced in the combustion chamber, a routing portion positioned to receive the combustion gas from the one or more collection ports, the routing portion comprising a cooking chamber routing duct comprising one or more routing ducts positioned to route a first portion of the combustion gas into the combustion chamber and a cooking chamber bypass duct comprising one or more bypass ducts positioned to route a second portion of the combustion gas along a path that bypasses the cooking chamber, and an exhaust portion comprising one or more exhaust ducts positioned to receive the first portion of the combustion gas from the cooking chamber and the second portion of the combustion gas from the one or more bypass ducts. The exhaust portion may further comprise one or more exhaust ports to exhaust the first and second portions of the combustion gas from the flue.

In some configurations, the one or more collection ports comprise one or more first collection ports disposed along a top wall of the combustion chamber to receive the first portion of the combustion gas and one or more second collection ports disposed along the top wall of the combustion chamber to receive the second portion of the combustion gas. A combined cross-sectional area defined by the one or more first collection ports may be approximately the same as a combined cross-sectional area defined by the one or more section collection ports. The oven system may further comprise a door defining a first wall of the cooking chamber. The cooking chamber routing duct may comprise a first routing duct and a second routing duct and the cooking chamber bypass duct may comprise a first bypass duct and a second bypass duct. In one embodiment, the first and second routing ducts may extend along a second wall of the cooking chamber and the first and second bypass ducts may extend along a third wall of the cooking chamber, different than the second wall. In another embodiment, the first and second routing ducts and the first and second bypass ducts may extend along a second wall of the cooking chamber, wherein the second wall is opposite the first wall.

In one example, at least one routing duct extends adjacent to the cooking chamber along a first shared wall with the cooking chamber. At least one bypass duct may also extend adjacent to the cooking chamber along a second shared wall with the cooking chamber and at least one exhaust duct may comprise a cooking chamber exhaust duct to receive the first portion of the combustion gas from the cooking chamber and direct the flow of the first portion of the combustion gas along a third shared wall with the cooking chamber. In a further example, the first and second shared walls are disposed along a rear wall of the cooking chamber. The third shared wall may be disposed along a top wall of the cooking chamber. The oven system may also include a sub-chamber disposed within the cooking chamber. The sub-chamber may house a convection fan operable to pull gas from the cooking chamber into the sub-chamber through one or more first openings and to expel the gas pulled into the sub-chamber back into the cooking chamber through one or more second openings. At least one bypass duct may extend adjacent to the sub-chamber along a fourth shared wall with the sub-chamber. In one example, the sub-chamber is disposed along a rear portion of the cooking chamber and is defined between a top wall, a bottom wall, a rear wall, a front wall, and a first and a second side wall. The fourth shared wall may comprise a fifth shared wall and a sixth shared wall. The first side wall may comprise the fifth shared wall and the second side wall may comprise the sixth shared wall.

In some configurations, at least one routing duct extends adjacent to the cooking chamber along a shared wall with the cooking chamber. In one configuration, at least one bypass duct may extend adjacent to the cooking chamber along a shared wall with the cooking chamber. In another configuration, at least one exhaust duct comprises a cooking chamber exhaust duct to receive the first portion of the combustion gas from the cooking chamber and flow the first portion of the combustion gas adjacent to the cooking chamber along a shared wall with the cooking chamber. The oven system may further comprise a sub-chamber disposed within the cooking chamber. The sub-chamber may house a convection fan operable to pull gas from the cooking chamber into the sub-chamber through one or more first openings and to expel the gas pulled into the sub-chamber back into the cooking chamber through one or more second openings. In one configuration, at least one bypass duct extends adjacent to the sub-chamber along a shared wall with the sub-chamber. The sub-chamber may be disposed along a rear portion of the cooking chamber and be defined between a top wall, a bottom wall, a rear wall, a front wall, and a first and a second side wall. At least one bypass duct may extend adjacent to the first side wall along a shared wall with the first side wall. The at least one bypass duct may extend adjacent to the second side wall along a shared wall with the second side wall.

In another aspect, a method of assembling an oven may include positioning a cooking chamber above a top wall of a combustion chamber; positioning one or more first collection ports along a top wall of the combustion chamber to receive a first portion of combustion gas produced in the combustion chamber; positioning one or more second collection ports along the top wall of the combustion chamber to receive a second portion of combustion gas produced in the combustion chamber; fluidically coupling one or more cooking chamber routing ducts between the one or more first collection ports and one or more delivery ports opening into the cooking chamber; fluidically coupling one or more cooking chamber exhaust ducts to one or more cooking chamber exhaust ports extending through a top wall of the cooking chamber; and fluidically coupling one or more cooking chamber bypass ducts between one or more second collection ports to receive a second portion of the combustion gas and one or more exhaust ducts in fluid communication with the cooking chamber exhaust duct. The one or more cooking chamber routing ducts is operative to receive the first portion of the combustion gas from the one or more first collection ports. The one or more cooking chamber bypass ducts is operative to receive the second portion of the combustion gas from the one or more second collection ports.

In some configurations, a combined cross-sectional area defined by the one or more first collection ports is approximately the same as a combined cross-sectional area defined by the one or more section collection ports. In one configuration, the method further includes positioning at least one routing duct adjacent to the cooking chamber to form a first shared wall with the cooking chamber; positioning at least one bypass duct adjacent to the cooking chamber to form a second shared wall with the cooking chamber; and positioning at least one cooking chamber exhaust duct adjacent to the top wall of the cooking chamber to form a third shared wall with the cooking chamber. In another configuration, the method includes positioning at least one routing duct adjacent to the cooking chamber to form a shared wall with the cooking chamber. In one configuration, the method includes positioning at least one bypass duct adjacent to the cooking chamber to form a shared wall with the cooking chamber. In one configuration, the method includes positioning at least one cooking chamber exhaust duct adjacent to the top wall of the cooking chamber to form a shared wall with the cooking chamber. In at least one configuration, the method includes, positioning a sub-chamber within the cooking chamber and positioning a first bypass duct adjacent to a first side of the sub-chamber and a second bypass duct adjacent to a second side of the sub-chamber to form respective first and second shared walls with the sub-chamber. The sub-chamber may house a convection fan operable to pull gas from the cooking chamber into the sub-chamber through one or more first openings and to expel the gas pulled into the sub-chamber back into the cooking chamber through one or more second openings.

BRIEF DESCRIPTION OF THE DRAWINGS

The novel features of the described embodiments are set forth with particularity in the appended claims. The described embodiments, however, both as to organization and manner of operation will become apparent by reference to the following description, taken in conjunction with the accompanying drawings in which:

FIG. 3A is a side elevation view of the oven. FIG. 3B is a front elevation view of the oven with the door removed. FIG. 3C is a top plan view of the oven with the door removed;

DESCRIPTION

Heat generated from combustion of combustible fuels may be used to heat ovens. For example, hot combustion gas produced in a combustion chamber may be used to directly heat a wall of the combustion chamber. The gas may thereafter be exhausted through a flue. The heat radiated from the heated wall may drive indirect heating within an adjacent cooking chamber. In some ovens, the escaping hot gas may also undergo a more complex path through the cooking chamber. Once a steady state combustion is reached, such ovens may heat faster than ovens employing exhaust paths that do not extend through the cooking chamber. The tradeoff, however, is that the time taken to reach steady state combustion is increased in such ovens. Additionally, until steady state is reached, some incomplete combustion products may pass through the cooking chamber with the combustion gas.

The present disclosure describes cooking ovens, oven systems, and methods thereof that may be used to provide the accelerated steady state combustion of an indirect gas heated oven and the accelerated heating rate achieved by allowing hot air directly into the cooking chamber. According to one embodiment, this may be achieved by providing an oven comprising a cooking chamber, a combustion chamber disposed below the cooking chamber that is in at least partial fluid communication with the cooking chamber, a flue for receiving a portion of the combustion gas from the combustion chamber and a portion of the combustion gas from cooking chamber, and an exhaust port in fluid communication with the flue to exhaust the received combustion gas therefrom. The flue may be a split flue configured to route a portion of the combustion gas through the cooking chamber and a portion of the gas along a route that does not include the cooking chamber. In this or another embodiment, the flue may include ducts having shared walls with the combustion chamber wherein the heat transferred to the shared walls of the ducts may be conducted to an adjacent side of the shared wall to indirectly heat the oven chamber. In a further embodiment, the flue may be split into multiple ducts disposed around a convection sub-chamber within the interior of the cooking chamber that houses a fan. The ducts may include one or more shared walls with the sub-chamber wherein the heat transferred to the shared walls of the duct may be conducted to an adjacent side of the shared wall to indirectly heat the interior of the cooking chamber within the sub-chamber.

Figure 1:
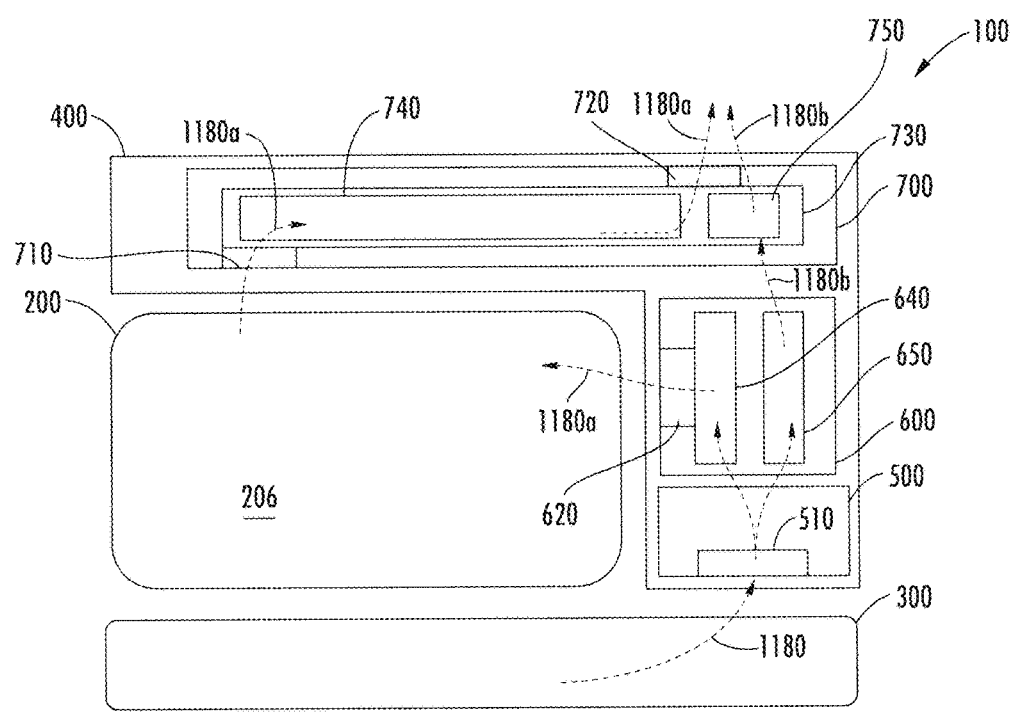
FIG. 1 is a semi-schematic of an oven system according to various embodiments described herein.

FIG. 1 is a semi-schematic illustrating an oven system 100 according to various embodiments. The oven system 100 includes a cooking chamber 200 defining an interior space 206 for heating an article, such as a food item, therein. The interior space 206 may be at least partially defined by a top wall, a bottom wall, and side walls. In some embodiments, the side walls include a front wall, a rear wall, and two lateral walls. The cooking chamber 200 may include a door that is movable to reveal and cover an opening to the interior space 206. The door may form one or more of the walls defining the interior space 206. For example, the door may be operable to form the front wall of the cooking chamber 200. The oven system 100 also includes a combustion chamber 300 configured to combust fuel and therein generate heat to heat the cooking chamber 200. The combustible fuel may be any suitable fuel, such as carbon based fuels, e.g., fossil fuels, natural gas, propane, biofuels, etc. The oven system 100 further includes a flue 400 to collect, route, and exhaust combustion gas 1180 produced in the combustion chamber 300. The flue 400 may be a split flue configured to collect the combustion gas 1180 and route a first portion 1180a of the combustion gas into the interior space 206 of the cooking chamber 200 while routing a second portion 1180b of the combustion gas along a route that does not include releasing the second portion 1180b of the combustion gas into the interior space 206 of the cooking chamber 200. The flue 400 may then collect and exhaust the first portion 1180a of the combustion gas from the cooking chamber 200 and exhaust both the first portion 1180a and the second portion 1180b of the combustion gas from the oven system 100.

The flue 400 includes a combustion chamber collection portion 500, a routing portion 600, and an exhaust portion 700. The combustion chamber collection portion 500 includes one or more collection ports 510 positioned to collect combustion gas 1180 from the combustion chamber 300 and direct the combustion gas 1180 to the routing portion 600 for routing through the oven system 100.

The routing portion 600 includes a cooking chamber routing duct 640 to receive a first portion 1180a of the combustion gas from the combustion chamber collection portion 500 and a cooking chamber bypass duct 650 to receive a second portion 1180b of the combustion gas from the combustion chamber collection portion 500.

The cooking chamber routing duct 640 defines a flow path between the collection portion 500 and the cooking chamber 200 and is positioned deliver the first portion 1180a of the combustion gas into the interior of the cooking chamber 200 via one or more delivery ports 620. The cooking chamber bypass duct 650 extends between the combustion chamber collection portion 500 and the exhaust portion 700 to route the second portion 1180b of combustion gas from the combustion chamber collection portion 500 to the exhaust portion 700.

The exhaust portion 700 comprises an exhaust duct 730 positioned to receive the first and second portions 1180a, 1180b of the combustion gas from the cooking chamber 200 and the bypass duct 650, respectively, and to exhaust the same from one or more flue exhaust ports 720. The exhaust duct 730 may include a cooking chamber exhaust duct 740 that is in at least partial fluid communication with the interior of the cooking chamber 200 via one or more cooking chamber exhaust ports 710 positioned to receive the first portion 1180a of the combustion gas from the cooking chamber 200. The cooking chamber exhaust duct 740 may be configured to direct the first portion 1180a of the combustion gas to the one or more flue exhaust ports 720. The exhaust portion 700 also includes a cooking chamber bypass exhaust duct 750 positioned to receive the second portion 1180b of the combustion gas from the cooking chamber bypass duct 650 and direct the second portion 1180b of the combustion gas to one or more flue exhaust ports 720.

In various embodiments, the combustion chamber 300 includes an upper portion along which the hot combustion gas 1180 rises. The upper portion may include a top wall, which may be adjacent to a bottom wall of the cooking chamber 200. For example, the top wall of the combustion chamber 300 and the bottom wall of the cooking chamber 200 may comprise a shared wall. The hot combustion gas 1180 generated in the combustion chamber 300 may heat the top wall of the combustion chamber 300. The heat may then pass to the adjacent bottom wall of the cooking chamber 200 to thereby indirectly heat the interior space 206 of the cooking chamber 200. The one or more collection ports 510 of the combustion chamber collection portion 500 may be defined along or positioned adjacent to the top wall of the combustion chamber 300. Although other or multiple locations may be used, the one or more collection ports 510 may be positioned along the top wall of the combustion chamber 300 along a periphery of the adjacent bottom wall of the cooking chamber 200 to maintain ample thermal transfer area for efficient heating of the bottom wall of the cooking chamber 200. For example, one or more collection ports 510 may be defined along a side, rear, or front portion of the top wall or other region of the top wall that does not substantially underlie the adjacent bottom wall of the cooking chamber 200. In this or another embodiment, one or more collection ports 510 are defined in a side, rear, or front wall of the combustion chamber 300, which may or may not be adjacent to the top wall. In one embodiment, the top wall is dimensioned to encourage or direct the flow of combustion gas 1180 toward one or more collection ports 510.

In various embodiments, the one or more collection ports 510 of the combustion chamber collection portion 500 include one or more first collection ports 510 for receiving the first portion 1180a of the combustion gas and one or more second collection ports 510 for receiving the second portion 1180a of the combustion gas. In this or another embodiment, one, more, or all of the collection ports 510 may be common collection ports positioned to collect both first and second portions 1180a, 1180b of the combustion gas as a combined stream and thereafter divide, e.g., separate, partition, etc., the first and the second portions 1180a, 1180b of the combustion gas from the combined stream.

In embodiments comprising multiple collection ports 510, the collection ports 510 may be one or more of positioned, dimensioned, or provided in numbers configured to control an amount or proportion of combustion gas 1180 received through one or more of the collection ports 510. For example, one or more first collection ports 510 for receiving the first portion 1180a of the combustion gas may be sized to have a same or greater cross-section or capacity than one or more second collection ports 510 for receiving the second portion 1180b of the combustion gas to encourage equivalent or non-equivalent flow volumes through the first and second collection ports 510. Similarly, the number of the first collection ports 510 may be the same or greater than the number of second collection ports 510 to encourage equivalent or non-equivalent flow volumes through the first and second collection ports 510. Examples ratios of non-equivalent flow volumes may include approximately 10:90, approximately 20:80, approximately 30:70, approximately 40:60, approximately 60:40, approximately 70:30, approximately 80:20, or approximately 90:10. Additional examples may include between 10:90 to 90:10, 20:80 to 80:20, 30:70 to 70:30, 40:60 to 70:30, 40:60 to 80:20, 50:50 to 60:40, 50:50 to 70:30, 50:50 to 80:20, 50:50 to 90:10, 60:40 to 70:30, 60:40 to 80:20, 60:40 to 90:10, 70:30 to 80:20, 70:30 to 90:10, or 80:20 to 90:10.

In one embodiment, at least one of the one or more collection ports 510 is adjustable. For example, a size, such as a diameter, width, opening dimension, etc., of one or more collection ports 510 may be selectively adjustable to increase or decrease an operational capacity of one or more collection ports 510. In one embodiment, one or more collection ports 510 may be selectively opened and closed. In this or another embodiment, one or more collection ports 510 may be selectively re-routable. For example, a collection port 510 may be selectively modifiable to operate as a first collection port for receiving the first portion 1180a of the combustion gas to be flowed to the cooking chamber routing duct 640 or as a second collection port for receiving the second portion 1180b of the combustion gas to be flowed to the cooking chamber bypass duct 650.

The cooking chamber routing duct 640 of the routing portion 600 may include one or more routing ducts in at least partial fluid communication with the combustion chamber 300 via one or more collection ports 510 of the combustion chamber collection portion 500 and the cooking chamber 200 via one or more cooking chamber delivery ports 640. The one or more routing ducts may include walls defining a flow path. In one embodiment, one, more, or all walls of a routing duct comprise thermally conductive materials. In this or another embodiment, one, more, or all walls of a routing duct may comprise thermally nonconductive or insulative materials. One or more walls may also comprise, e.g., be lined with, refractory materials. The one or more routing duct walls may comprise the same or different materials. For example, an adjacent or shared wall may comprise a thermally conductive material, while one or more additional walls of the routing duct may comprise the same or a different thermally conductive material or a non-thermally conductive or insulative material. In one configuration, one or more routing duct walls comprise a shared wall with respect to the adjacent cooking chamber 200. The shared wall may comprise a thermally conductive material thereby promoting heat transfer to the adjacent side of the shared wall. In a further example, one or more walls of the routing duct that are not adjacent to or shared with the cooking chamber 200 may comprise thermally nonconductive or thermally insulative materials thereby decreasing heat loss from such walls.

In one embodiment, one or more routing ducts of the cooking chamber routing duct 640 each define a separate flow path between the combustion chamber 300 and the cooking chamber 200. In another embodiment, two or more routing ducts of the cooking chamber routing duct 640 define a shared common flow path prior to a divergence or after a convergence of the ducts between the combustion chamber collection portion 500 and the cooking chamber 200. For example, a routing duct may extend from the combustion chamber 300 and be positioned to receive first combustion gas 1180a therefrom via one or more collection ports 510 of the combustion chamber collection portion 500. The routing duct may extend a first distance from the combustion chamber 300 and thereafter diverge into one or more secondary or tertiary routing ducts prior to a cooking chamber delivery port 620, through which the first portion 1180a of the combustion gas may be released into the interior space 206 of the cooking chamber 200. In another example, a plurality of routing ducts may extend from the combustion chamber 300 and be positioned to receive the first portion 1180a of the combustion gas therefrom via one or more collection ports 510 of the combustion chamber collection portion 500. The plurality of routing ducts may extend a same or different distance from the combustion chamber collection portion 500 and converge into fewer, e.g., one or two, routing ducts prior to one or more cooking chamber delivery ports 620, through which the first portion of the combustion gas 1180a may be released into the interior space 206 of the cooking chamber 200.

The one or more routing ducts of the cooking chamber routing portion 600 may extend generally vertically from the combustion chamber 300 to one or more cooking chamber delivery ports 620. The vertical component of the one or more routing ducts may include a vertical distance with respect to the bottom wall of the cooking chamber 200 that positions the delivery port 620 at a location that is less than, equal to, or greater than midway between the bottom wall and the top wall of the cooking chamber 200. One or more routing ducts of the cooking chamber routing duct 640 may also include a horizontal component to route the combustion gas horizontally as well as vertically. In various embodiments, at least a portion of a routing duct extends within the cooking chamber 200. For example, one or more walls of the duct may run adjacent to a wall, such as a top, bottom, lateral, front, or rear wall, of the cooking chamber 200. In one configuration, two, three, four, or all walls of one or more routing ducts comprise a shared wall with the cooking chamber 200. For example, a routing duct may extend through a portion of the interior space 206 of the cooking chamber 200 along one or more walls of the cooking chamber 200 or within the cooking chamber 200 such that the interior space 206 of the cooking chamber 200 surrounds the duct. One or more routing ducts may also be partially surrounded by the interior space 206. In one configuration, the one or more walls of the duct running adjacent to the side wall comprise a shared wall with respect to the side wall of the adjacent cooking chamber 200. Thus, the cooking chamber 200 may be heated by conduction and radiation from the combustion chamber 300, by convection from the hot combustion gas 1180a that enter the interior space 206 of the cooking chamber 200 via the cooking chamber routing duct 640, and by conduction and radiation from the cooking chamber routing duct 640 running adjacent to or sharing a common wall with the cooking chamber 200.

In various embodiments, one or more cooking chamber delivery ports 620 are located through or adjacent to a side wall of the cooking chamber 200. The side wall may be a lateral wall, rear wall, or front wall. In these or another embodiment, one or more cooking chamber delivery ports 620 are located within a central portion of the cooking chamber 200 along the bottom wall. Cooking chamber delivery ports 620 may comprise angularly orientated openings that open into the interior space 206 of the cooking chamber 200. For example, one or more delivery ports 620 may be positioned to release the first portion 1180a of the combustion gas through openings that are oriented horizontally, vertically, or other orientation. The delivery ports 640 may be positioned to direct the first portion 1180*a* of the combustion gas along the top wall of the combustion chamber to thereby heat the top wall. Cooking chamber delivery ports 620 may be positioned at various vertical locations between the top wall and the bottom wall of the cooking chamber 200. In one embodiment, one or more delivery ports 620 are positioned between the bottom wall and midway between the bottom wall and the top wall. In this or another embodiment, one or more delivery ports 620 are positioned between the top wall and midway between the bottom wall and the top wall. In one embodiment, all delivery ports 620 are positioned midway between the bottom wall and the top wall or less than midway from the bottom wall to the top wall. In another embodiment, all delivery ports 620 are positioned midway between the bottom wall and the top wall or greater than midway from the bottom wall to the top wall.

The cooking chamber bypass duct 650 of the routing portion 600 includes one or more bypass ducts in at least partial fluid communication with the combustion chamber 300 via the one or more collection ports 510 of the combustion chamber 300 and the exhaust portion 700. The one or more bypass ducts may include walls defining a flow path. In one embodiment, one, more, or all walls of a bypass duct comprise thermally conductive materials such as a metal, iron, steel, or metal alloy. In this or another embodiment, one, more, or all walls of a bypass duct comprise thermally nonconductive or insulative materials. One or more walls may also comprise, e.g., be lined with, refractory materials. In one configuration, one or more bypass duct walls comprise a shared wall with respect to a side wall of the cooking chamber 200. The one or more bypass duct walls may comprise the same or different materials. For example, an adjacent or shared wall may comprise a thermally conductive material, while one or more additional walls of the bypass duct may comprise the same or a different thermally conductive material or a non-thermally conductive or insulative material. For example, walls of a bypass duct adjacent to or shared with the interior space 206 of the cooking chamber 200 may comprise thermally conductive materials while other walls may comprise thermally nonconductive or thermally insulative materials.

In one embodiment, one or more bypass ducts of the cooking chamber bypass duct 650 define a separate flow path between the combustion chamber 300 and the exhaust portion 700. In another embodiment, two or more bypass ducts of the cooking chamber bypass duct 650 define a shared common flow path prior to a divergence or after a convergence of the ducts between the combustion chamber collection portion 500 and the exhaust portion 700. For example, a bypass duct may extend from the combustion chamber 300 and be positioned to receive second combustion gas 1180*b* therefrom via one or more collection ports 510 of the combustion chamber collection portion 500. The bypass duct may extend a first distance from the combustion chamber 300 and diverge into one or more secondary or tertiary bypass ducts prior to reaching the exhaust portion 700 into which the second portion 1180*b* of the combustion gas is released. In another example, a plurality of bypass ducts may extend from the combustion chamber 300 and be positioned to receive the second portion 1180*b* of the combustion gas therefrom via one or more collection ports 510 of the combustion chamber collection portion 500. The plurality of bypass ducts may extend a same or different distance from the combustion chamber collection portion 500 and converge into fewer, e.g., one or two, bypass ducts prior to reaching the exhaust portion 700 into which the second portion 1180*b* of the combustion gas is released.

The one or more bypass ducts of the cooking chamber bypass duct 650 may extend generally vertically from the combustion chamber 300 to the exhaust duct 730 or flue exhaust port 720 of the exhaust portion 700. One or more bypass ducts of the cooking chamber bypass duct 650 may also include a horizontal component to route the second portion 1180*b* of the combustion gas horizontally as well as vertically. In various embodiments, a wall of a bypass duct runs adjacent to a side wall, such as a lateral, front, or rear wall, of the cooking chamber 200. In one configuration, the wall of the bypass duct running adjacent to the side wall comprises a shared wall with respect to the side wall of the cooking chamber 200. In various embodiments, at least a portion of one, more, or all the bypass ducts extend within the cooking chamber 200. For example, a wall of the duct may run adjacent to a wall, such as a top, bottom, lateral, front, or rear wall, of the cooking chamber 200. In one configuration, the wall of the bypass duct running adjacent to the side wall comprises a shared wall with respect to the side wall of the adjacent cooking chamber 200. In one configuration, two, three, four, or all walls of one or more bypass ducts comprise a shared wall with the cooking chamber 200. For example, a bypass duct may extend through a portion of the interior space 206 of the cooking chamber 200 along one or more walls of the cooking chamber 200 or within the cooking chamber 200 such that the interior space 206 of the cooking chamber surrounds or partially surrounds the duct. Thus, the cooking chamber 200 may be heated by conduction and radiation from the combustion chamber 300, by convection from the hot combustion gas that enter via the cooking chamber routing duct 640, and by conduction and radiation from the ducts of the combustion chamber 300 routing duct 640 and cooking chamber bypass duct 650 that run adjacent to or share a common wall with the combustion chamber 300.

In various embodiments, one or more walls of a bypass duct of the cooking chamber bypass duct 650 may run adjacent to a side wall, such as a lateral, front, or rear wall, of an adjacent routing duct of the cooking chamber routing duct 640. In one configuration, the one or more walls of the bypass duct running adjacent to the wall of the routing duct may comprise a shared wall with respect to the adjacent routing duct. In one embodiment, one or more bypass ducts include at least one wall adjacent to a side wall of the cooking chamber 200 and at least one wall adjacent to a wall of a routing duct.

The exhaust duct 730 of the exhaust portion 700 may include one or more ducts positioned to receive the first portion 1180*a* of the combustion gas from the cooking chamber 200 via one or more cooking chamber exhaust ports 710 and the second portion 1180*b* of the combustion gas from the cooking chamber bypass duct 650. For example, the cooking chamber exhaust duct 740 may be positioned to receive the first portion 1180*a* of the combustion gas from the cooking chamber 200 via the cooking chamber exhaust port 710. The cooking chamber exhaust duct 740 may therefore be in at least partial fluid communication with the interior space 206 of the cooking chamber 200 via one or more cooking chamber exhaust ports 710 and with one or more flue exhaust ports 720.

In various embodiments, one or more cooking chamber exhaust ports 710 are located along an upper portion of the cooking chamber 200. For example, one or more cooking chamber exhaust ports 710 may extend through the top wall of the cooking chamber 200. In another example, one or more cooking chamber exhaust ports 710 may extend through a side wall of the cooking chamber 200 adjacent to the top wall. In one embodiment, the cooking chamber exhaust duct 730 is positioned above the cooking chamber 200 to receive the first combustion gas 1180*a* from the cooking chamber 200 via the one or more cooking chamber exhaust ports 710. The cooking chamber exhaust duct 740 may include a plurality of ducts extending along separate or common flow paths to separate or common flue exhaust ports 720. A common exhaust duct or flue exhaust port 720, for example, may provide a common flow path for one, more, or all ducts of the exhaust duct 730 that converge into the common path. In one embodiment, the cooking chamber exhaust duct 740 comprises a common duct positioned to receive all the first portion 1180*a* of the combustion gas from the cooking chamber 200 via one or a plurality of cooking chamber exhaust ports 710.

The cooking chamber bypass exhaust duct 750 may include one or more ducts defining one or more flow paths in at least partial fluid communication with the cooking chamber bypass duct 650 to receive the second portion 1180*b* of the combustion gas and one or more flue exhaust ports 720 to exhaust the second portion 1180*b* of the combustion gas therethrough. In one embodiment, the cooking chamber bypass exhaust duct 750 includes a plurality of separate ducts extending to separate or common flue exhaust ports 720. In this or another embodiment, the cooking chamber bypass exhaust duct 750 includes a plurality of separate ducts extending to one or more common ducts and one or more common flue exhaust ports 720. The common ducts or ports may provide common flow paths for one, more, or all the ducts of the cooking chamber bypass exhaust duct 750 that converge into the common path. In one embodiment, the cooking chamber bypass exhaust duct 750 comprises a common duct positioned to receive all of the second portion 1180*b* of the combustion gas from the cooking chamber bypass duct 650.

In various embodiments, one or more ducts of the exhaust portion 700 may include a shared wall with the cooking chamber 200. In one example, one or more ducts of the exhaust portion 700 extend adjacent to the cooking chamber 200 or at least partially through the interior space 206 of the cooking chamber 200. In a further example, the cooking chamber exhaust port 710 is defined along a top wall of the cooking chamber 200 such that the first portion 1180*a* of the combustion gas within the cooking chamber 200 flows along the top wall to the exhaust port 710 thereby heating the interior space 206 by convection while also heating the top wall. The first portion 1180*a* of the combustion gas may then flow through the cooking chamber exhaust port 710 into the cooking chamber exhaust duct 740. In a further embodiment, the cooking chamber exhaust duct 740 may also extend adjacent to the cooking chamber 200 such that the first portion 1180*a* of the combustion gas flowing therein may transfer heat to a duct wall thereby indirectly heating the adjacent cooking chamber 200. For example, the cooking chamber exhaust duct 740 may include a shared wall with the cooking chamber 200. In one such embodiment, the cooking chamber exhaust duct 740 includes a wall adjacent to the top wall of the cooking chamber 200. Thus at least a portion of the cooking chamber exhaust duct 740 may comprise a shared wall with the cooking chamber 200 positioned to indirectly heat the cooking chamber 200 when the first portion 1180*a* of the combustion gas is exhausted from the cooking chamber 200. In one of the above or another embodiment, the cooking chamber bypass duct 650, a common duct, or both may include a shared wall with the cooking chamber 200 positioned to indirectly heat the cooking chamber 200 when the combustion gas 1180 is flowed through the exhaust portion 700.

In various embodiments, the exhaust duct 730 includes a common exhaust duct in at least partial fluid communication with at least one duct of the cooking chamber exhaust duct 740 and at least one duct of the cooking chamber bypass exhaust duct 750. The common exhaust duct may be positioned to receive at least a portion of the first portion 1180*a* of the combustion gas from the cooking chamber exhaust duct 740 and at least a portion of the second portion 1180*b* of the combustion gas from the cooking chamber bypass duct 650 or the cooking chamber bypass exhaust duct 750. The common exhaust duct may be in fluid communication with one or more flue exhaust ports 720 and be configured to direct the combined stream of combustion gas 1180 therethrough. Thus the combined stream of combustion gas 1180 may flow through the common exhaust duct to a flue exhaust port 720 where the gas 1180 may exit the flue 400.

In some embodiments, one or more portions of the flue 400 are not configured to route combustion gas 1180 to a common exhaust duct. In one such embodiment, only a portion of the first portion 1180*a* of the combustion gas received from the cooking chamber 200 is combined with the second portion 1180*b* of the combustion gas before exiting the flue 400. Thus, a portion of the first portion 1180*a* of the combustion gas may be exhausted from the flue 400 separate from the second portion 1180*b* of the combustion gas. In another embodiment, the first and second portions 1180*a*, 1180*b* of the combustion gas are not combined in the exhaust portion 700. In one such embodiment, the exhaust portion 700 does not include a common exhaust duct to flow the combined stream of combustion gas 1180 to a common flue exhaust port 720. In another embodiment, all of the first portion 1180*a* of the combustion gas received from the cooking chamber 200 is combined with all or a portion of the second portion 1180*b* of the combustion gas received from the cooking chamber bypass duct 650 and subsequently exhausted together from a flue exhaust port 720 in a combined stream.

Figure 2:
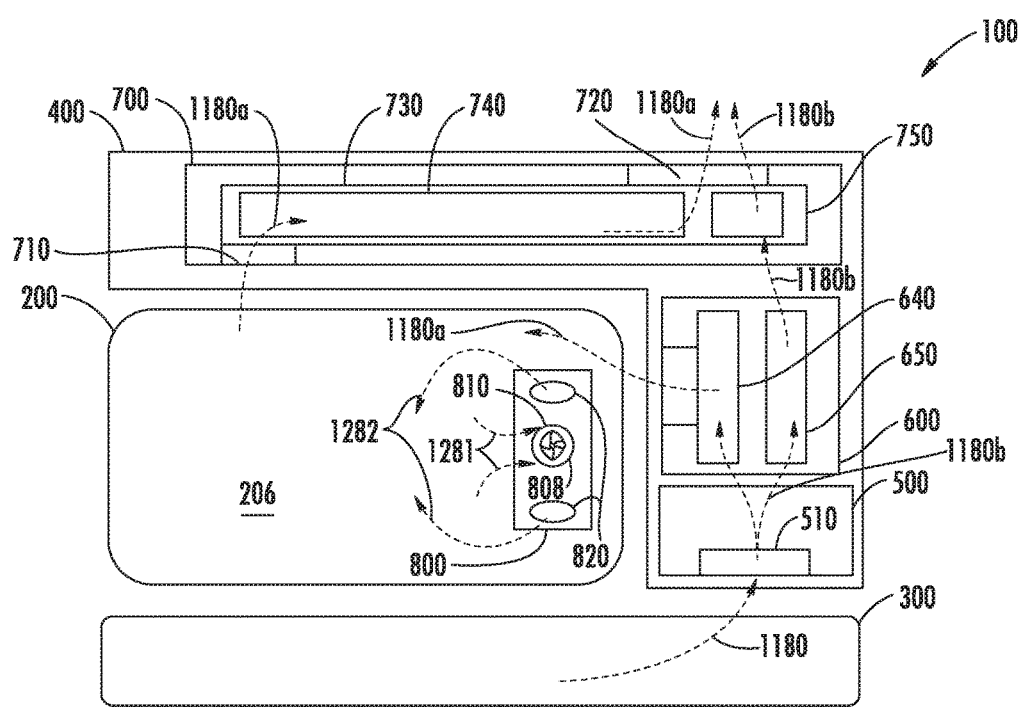
FIG. 2 is a semi-schematic of an oven system according to various embodiments described herein.

FIG. 2 illustrates a further embodiment of the oven system 100 wherein the oven system 100 comprising a fan 808. According to various embodiments, any of the embodiments described above or combinations of features thereof may further include at least one fan 808. The fan 808 may be positioned within the interior space 206 of cooking chamber 200 or fluidically coupled thereto and operable to circulate fluid therein. Thus, the fan 808 may further assist in heating the oven chamber 200 by convection. In one embodiment, the fan 808 may be at least partially positioned in a sub-chamber 800 or fluidically coupled thereto via one or more openings. The sub-chamber 800 may include one or more openings 810 through which fluid, that is gases or liquids such as hot air, water vapor or steam and carbon dioxide, within the interior space 206 cooking chamber 200 may be pulled, as indicated by arrows 1281, into the sub-chamber 800. A portion of the fluid may also include amounts of the first portion 1180*a* of the combustion gas delivered into the interior space 206 of the cooking chamber 200. The one or more openings 810 may preferably correspond to part or all of a face of the fan 808, although other locations may be used, for example, in consideration of the particular fan 808 or sub-chamber 800 configuration chosen, such as an area of low pressure within the sub-chamber 800. The sub-chamber 800 may also include one or more openings 820 along a side, top, or bottom portion through which the fluid pulled 1281 into the sub-chamber 800 may be expelled, as depicted by arrows 1282, from the sub-chamber 800, thereby recirculating the fluid within the interior space 206 of the cooking chamber 200.

In one embodiment, the sub-chamber 800 is disposed along a rear portion or rear wall of the cooking chamber 200. In a further embodiment, the sub-chamber 800 is disposed between one or more routing ducts of the cooking chamber routing duct 640 or one or more bypass ducts of the cooking chamber bypass duct 650. For example, one, more, or all routing ducts of the cooking chamber routing duct 640 may be positioned adjacent to, or straddle, the sub-chamber 800. In this or another embodiment, one, more, or all bypass ducts of the cooking chamber bypass duct 650 may be positioned adjacent to, or straddle, the sub-chamber. In any of these or another embodiment, one or more routing ducts of the cooking chamber routing duct 640 or bypass ducts the cooking chamber bypass duct 650 may include a shared wall with sub-chamber 800. The shared wall may comprise a thermally conductive material through which heat transferred to the shared wall by the combustion gas 1180a, 1180b flowing through the duct may radiate into the cooking chamber 200, sub-chamber 800, or both.

In some embodiments, the cooking chamber routing duct 640 comprises two or more routing ducts, each extending along a side wall of the sub-chamber 200. At least two of the routing ducts may straddle the sub-chamber 800, for example, along a rear portion of the cooking chamber 200. The bypass duct 650 may comprise one or more bypass ducts that extend adjacent to or within the cooking chamber 200, also along the rear portion or along another portion of the cooking chamber 200. For example, one or more bypass ducts may extend along a side wall of the cooking chamber 200. In one such embodiment, at least a first bypass duct extends along a first side wall of the cooking chamber 200 and at least a second bypass duct extends along a second side wall of the cooking chamber 200, opposite the first. In various embodiments, the bypass ducts may be positioned along the lateral side walls along a forward, mid, or rear portion of the cooking chamber 200. In another embodiment, the bypass duct 650 may comprise two or more bypass ducts, each extending along a side wall of the sub-chamber 800. At least two of the bypass ducts may straddle the sub-chamber 800, for example, along a rear portion of the cooking chamber 200. In one embodiment, the sub-chamber 800 is straddled by a routing duct on a lateral side and a bypass duct on a second lateral side. In at least one embodiment, one or more routing ducts or one or more bypass ducts extend along or form a portion of a rear wall of the sub-chamber 800.

One or more routing ducts may extend adjacent to or within the cooking chamber 200 along the rear portion or along another portion of the cooking chamber 200. For example, one or more routing ducts may extend along a rear wall of the cooking chamber 200. In one embodiment, at least a first routing duct extends along a first side wall of the cooking chamber 200 and at least a second routing duct extends along a second side wall of the cooking chamber 200, opposite the first. The routing ducts may be positioned along the lateral side walls along a forward, mid, or rear portion of the cooking chamber 200. Other configurations may also be used. In one example, a first routing duct may be positioned along a rear portion or rear wall of the cooking chamber 200 on a first side of the sub-chamber 800 and a first bypass duct may be positioned along a rear portion or rear wall of the cooking chamber 200 along a second side of the sub-chamber 800. In a further example, a second routing duct may be positioned along the rear portion or rear wall of the cooking chamber 200 along the first side of the sub-chamber 800 and a second bypass duct may be positioned along the rear portion or rear wall of cooking chamber 200 along the second side of the sub-chamber 800. The first and second routing ducts share a wall or may be spaced apart between the sub-chamber 800 and a first lateral wall of the cooking chamber 200. The first and second bypass ducts may similarly share a wall or may be spaced apart between the sub-chamber 800 and a second lateral wall of the cooking chamber 200.

In one embodiment, one, more, or all walls of one or more routing ducts or one or more bypass ducts are surrounded by an interior space of the sub-chamber 800. In one such configuration, a routing duct and a bypass duct each share a wall with the cooking chamber 200 and two or more walls with the sub-chamber. The routing duct and the bypass duct may be attached to a rear wall of the cooking chamber 200 within the sub-chamber 800 and at least partially spaced apart from the rear wall. The routing duct and the bypass duct may also share a wall.

Various features of the oven system 100 will now be described with respect to an exemplary embodiment of an oven. However, those having skill in the art will appreciate that ovens may be designed in many configurations and the beneficial features described herein may be similarly applied to such designs by applying the teachings herein.

Figure 3A:
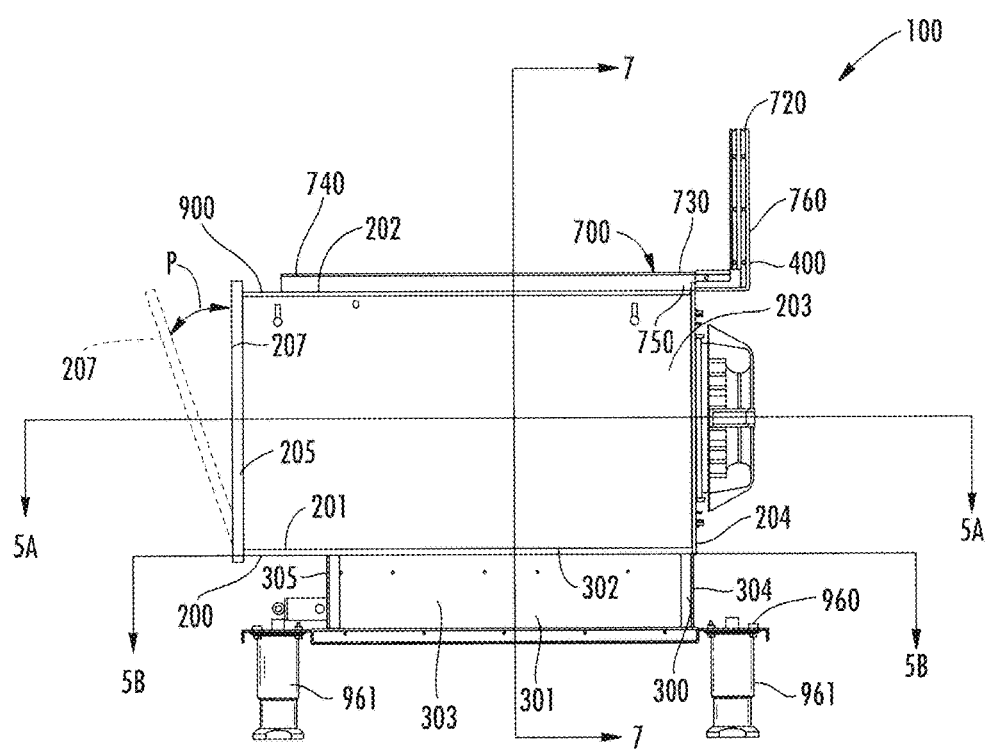
FIGS. 3A-3C provide views of an oven according to various embodiments of the oven system described herein.
Figure 3B:
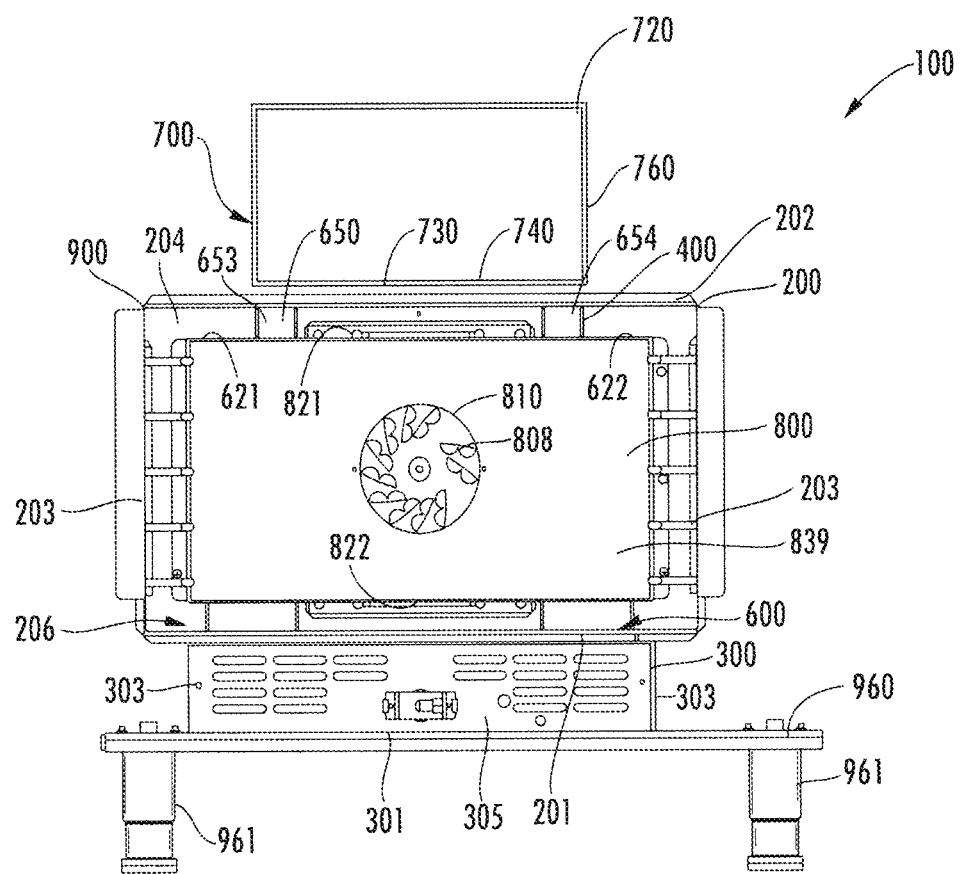
Figure 3C:
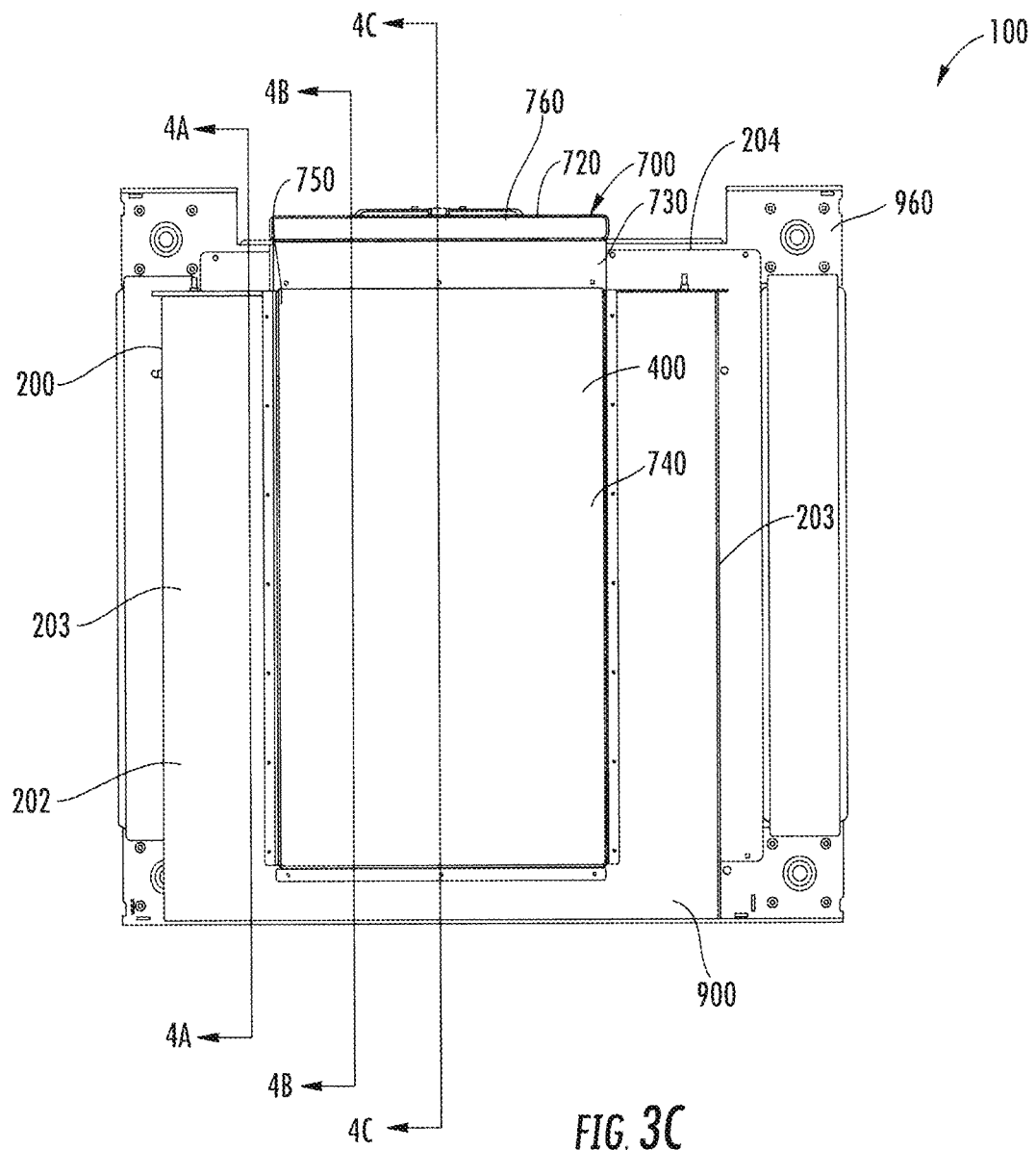

Referring to FIGS. 3A-3C and the additional views illustrated in FIGS. 4A-7, and with continued reference FIGS. 1 & 2, wherein like reference numerals refer to like components, in one embodiment, the oven system 100 includes an oven 900 having a cooking chamber 200, a combustion chamber 300, and a flue 400 mounted on a base 960. The base 960 includes support features 961, such as legs, positioned to support the oven 900.

As most clearly shown in FIG. 3B, the cooking chamber 200 includes a bottom wall 201, top wall 202, two lateral walls 203, a rear wall 204, and a front wall 205 (FIG. 3A) defining an interior space 206 dimensioned to receive an item to be heated. The view provided in FIG. 3A includes a door 207 comprising the front wall 205 and is disposed along the front of the cooking chamber 200. The door 207 may be movable, for example as indicated by arrow P, between a closed position and an open position to provide access to the interior space 206 of the cooking chamber 200. For example, the door 207 may be movably mounted, e.g., pivotable, slidably, extendably, etc., to the cooking chamber 200 such that the door 207 may be moved from a closed position to an open position to reveal an opening to the interior space 206. The door 207 may also be moved from an open position to the closed position to close, block, or otherwise obstruct the opening. The door 207 may further include a handle (not shown) dimensioned to be grasped by a user to translate the door 207 between the open and closed positions. The door 207 has been removed from the views shown in FIGS. 3B-6 to more clearly show the various features of the oven system.

The combustion chamber 300 is positioned below the cooking chamber 200. As most clearly shown in FIGS. 4A-4C, the combustion chamber 300 includes a bottom wall 301, a top wall 302, two lateral walls 303 (see, e.g., FIG. 3B), a rear wall 304, and a front wall 305 dimensioned to house heating elements 370 (FIGS. 4C & 7), which may include burners configured to combust fuel, such as gas.

The flue 400 includes a collection portion 500, a routing portion 600, and an exhaust portion 700. The combustion chamber collection portion 500 includes collection ports 510 (see, e.g., FIG. 5B) positioned to collect combustion gas 1180 from the combustion chamber 300 and supply the combustion gas 1180 to the routing portion 600 for routing of a first portion 1180a of the combustion gas through the oven system 100. The routing portion 600 includes a cooking chamber routing duct 640 comprising one or more routing ducts 641, 642 in at least partial fluid communication with one or more collection ports 511, 512 and is positioned to receive the first portion 1180a of the combustion gas from the combustion chamber collection portion 500. The routing portion 600 further includes a cooking chamber bypass duct 650 comprising one or more bypass ducts 653, 654 in at least partial fluid communication with one or more collection ports 513, 514 and is positioned to receive a second portion 1180b of the combustion gas from the combustion chamber collection portion 500. The cooking chamber routing duct 640 extends from the collection portion 500 to the cooking chamber 200 to deliver the first portion 1180a of the combustion gas into the interior space 206 of the cooking chamber 200 via the cooking chamber delivery port 620. The cooking chamber bypass duct 650 extends between the combustion chamber collection portion 500 and the exhaust portion 700 to route the second portion 1180b of combustion gas from the combustion chamber collection portion 500 to the exhaust portion 700. The exhaust portion 700 is positioned to receive the first and second portions 1180a, 1180b of the combustion gas from the cooking chamber 200 and the bypass duct 650, respectively, and exhaust the same from the flue exhaust port 720. The exhaust portion 700 includes a cooking chamber exhaust duct 740 positioned to receive the first portion 1180a of the combustion gas from the interior space 206 of the cooking chamber 200 and direct the first portion 1180a of the combustion gas to one or more flue exhaust ports 720. The exhaust portion 700 also includes a cooking chamber bypass exhaust duct 750 positioned to receive the second portion 1180b of the combustion gas from the cooking chamber bypass duct 650 and therein direct the gas 1180b to the flue exhaust port 720.

In operation, hot combustion gas 1180 produced in the combustion chamber 300 rises from the heating elements 370 and flows along the top wall 302 of the combustion chamber 300. The hot combustion gas 1180 produced in the combustion chamber 300 may heat the top wall 302 of the combustion chamber 300. The heat may then thermally conduct to the bottom wall 201 of the cooking chamber 200 to thereby indirectly heat the interior space 206 of the cooking chamber 200. In the illustrated embodiment, the top wall 302 of the combustion chamber 300 comprises a shared wall 332 with the bottom wall 201 of the cooking chamber 200 to promote efficient heat transfer. The collection portion 500 includes one or more collection ports 510, which in this embodiment includes collection ports 511, 512, 513, 514 (FIGS. 4A, 4B & 5B), defined in or extending through the top wall 302 of the combustion chamber 300. The collection ports 511, 512, 513, 514 are positioned along the top wall 302 of the combustion chamber 300 along a periphery of the adjacent bottom wall 201 of the cooking chamber 200 to maintain ample thermal transfer area for efficient heating of the bottom wall 201 of the cooking chamber 200, thereby preserving thermal transfer area along the shared wall 332 underlying the interior space 206 of the cooking chamber 200. In this embodiment, the collection ports 510 include two first collection ports 511, 512 for receiving the first portion 1180a of the combustion gas and two second collection ports 513, 514 for receiving the second portion 1180a of the combustion gas. The number and size of the collection ports 510 are approximately equivalent to maintain an approximately equivalent flow volume of first and second portions 1180a, 1180b of combustion gas flowed to the cooking chamber routing duct 640 and the cooking chamber bypass duct 650, respectively. In other embodiments, the number and size of the collection ports 510 may be modified to provide non-equivalent flow volumes.

The cooking chamber routing duct 640 of the routing portion 600 includes two first routing ducts 641, 642 (see, e.g., FIGS. 4A & 5A) in at least partial fluid communication with the combustion chamber 300 via the first collection ports 511, 512 of the combustion chamber collection portion 500 and the cooking chamber 200 via the cooking chamber delivery port 620. In the illustrated embodiment, the cooking chamber delivery port comprises a first port 621 for exhausting the first portion 1180a of the combustion gas routed through routing duct 641 and a second port 622 (FIG. 3B) for exhausting the first portion 1180a of the combustion gas routed through routing duct 642. The first and second ports 621, 622 have substantially similar dimensions, but, in other embodiments, the first port 621, second port 622, or additional ports may have different dimensions. Routing ducts 641 and 642 also have substantially similar dimensions, but, in other embodiments, the routing duct 641, routing duct 642, or additional routing ducts may have different dimensions. The routing ducts 641, 642 include walls defining separate flow paths between the collection portion 500 and the interior space 206 of the cooking chamber 200. The routing ducts 641, 642 vertically extend within the cooking chamber 200 to position the ports 621 of the cooking chamber delivery port 620 a vertical distance relative to the bottom wall 201 greater than midway between the bottom wall 201 and the top wall 202. The ports 621, 622 are vertically oriented to direct the first portion 1180a of the combustion gas vertically into the interior space 206 of the cooking chamber 200. The first portion 1180a of the combustion gas directed into the interior space 206 may flow toward the cooking chamber exhaust port 710 along the top wall 202 and therealong heat the top wall 202.

The cooking chamber bypass duct 650 includes two bypass ducts 653, 654 (see, e.g., FIGS. 4B & 5A) in at least partial fluid communication with the combustion chamber 300 via the second collection ports 513, 514 of the combustion chamber collection portion 500 and the exhaust portion 700. The bypass ducts 653, 654 include walls defining separate flow paths between the collection portion 500 and the exhaust portion 700. The bypass ducts 653, 654 vertically extend within the cooking chamber 200 a vertical distance spanning the interior space 206 between the bottom wall 201 and the top wall 202. Routing duct 641 and bypass duct 653 share a common wall 631. Similarly, routing duct 642 and bypass duct 654 share a common wall 632.

The oven system 100 further includes an optional fan 808 positioned within the cooking chamber 200. The fan is operable to circulate fluid therein and thereby distribute and recirculate the fluid, providing a more uniform temperature and faster cooking of some foods. The fan 808 is at least partially positioned in a sub-chamber 800 disposed along a rear portion of the cooking chamber 200 (see, e.g., FIGS. 3B, 4C, & 5A). The sub-chamber 800 includes an opening 810 formed therein through which fluid within the cooking chamber 200, which may include the first portion 1180a of the combustion gas, may be pulled into the sub-chamber 800. The dimensions of the opening 810 approximately correspond to the face of the fan 808. The sub-chamber 800 also includes an opening 821 along a top portion and an opening 822 along a bottom portion through which the fluid pulled within the sub-chamber 800 may be expelled from the sub-chamber 800, thereby circulating the fluid within the interior space 206 of the cooking chamber 200. As most clearly shown in the cross-section view of FIG. 5A, the sub-chamber 800 is straddled or disposed between the bypass ducts 653, 654 of the cooking chamber bypass duct 650. The bypass ducts 653, 654 and the sub-chamber 800 are further disposed between routing ducts 641, 642 of the cooking chamber routing duct 640 and ports 621, 622 of the cooking chamber delivery port 620. As described above with respect to FIGS. 1 & 2, other configurations may be used. For example, in another embodiment, the sub-chamber 800 is straddled or disposed between the bypass ducts 653, 654 and the routing ducts 641, 642 wherein the bypass ducts 653, 654 extend along a first side of the sub-chamber 800, between the sub-chamber 800 and a lateral wall 203, and the routing ducts 641, 642 extend along a second side of the sub-chamber 800, opposite the first, between the sub-chamber 800 and the opposing lateral wall 203. One or both of the bypass ducts 653, 654 may share a wall with the sub-chamber 800. In this or another embodiment, one or both of the routing ducts 641, 642 may share a wall with the sub-chamber 800.

The routing ducts 641, 642 and the bypass ducts 653, 654 are at least partially formed of a thermally conductive material such as a metal, iron, steel, or metallic alloy. The routing ducts 641, 642 and the bypass ducts 653, 654 extend at least partially within the interior space 206, along a rear portion, of the cooking chamber 200 and each include a shared wall 633, 634, 635, 636 with the cooking chamber 200. The shared walls 633, 634, 635, 636 are formed of a thermally conductive material to further indirectly heat the interior space 206 of the cooking chamber 200 via conduction and radiation from the shared walls 633, 634, 635, 636. Thus, the interior space 206 of the cooking chamber 200 may be heated by conduction and radiation from the combustion chamber 300, by convection from the hot combustion gas 1180a that enters via the cooking chamber routing duct 640, and by conduction and radiation from the shared walls 633, 634, 635, 636 of the routing ducts 641, 642 and bypass ducts 653, 654.

Figure 4A:
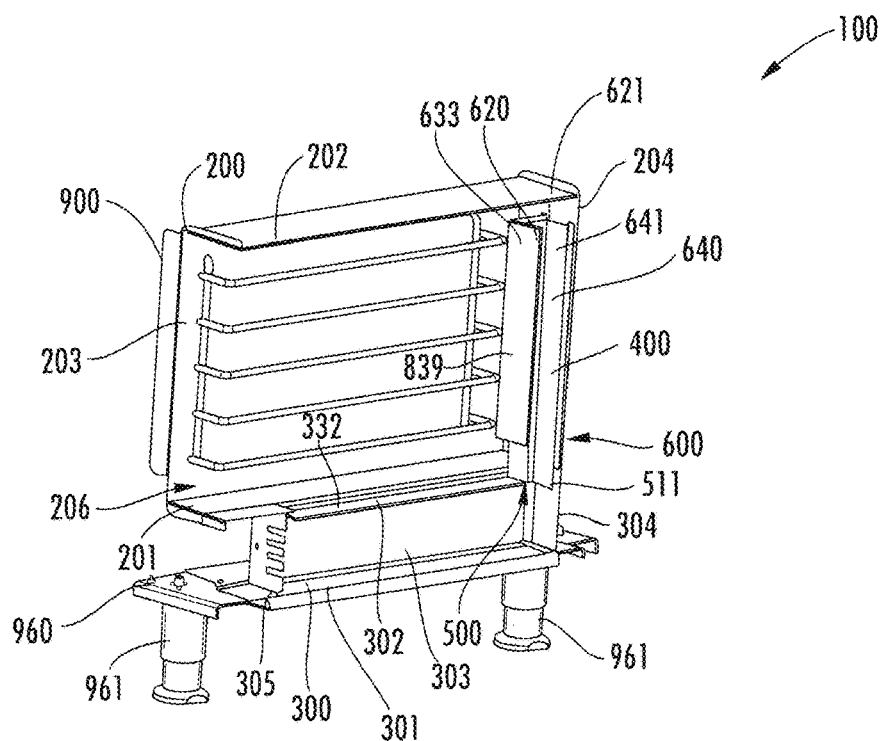
FIGS. 4A-4C are cross-sectional views in perspective of the oven illustrated in FIGS. 3A-3C taken along the sectional lines 4A-4A, 4B-4B, and 4C-4C, respectively, of FIG. 3C according to various embodiments of the oven system described herein.
Figure 4B:
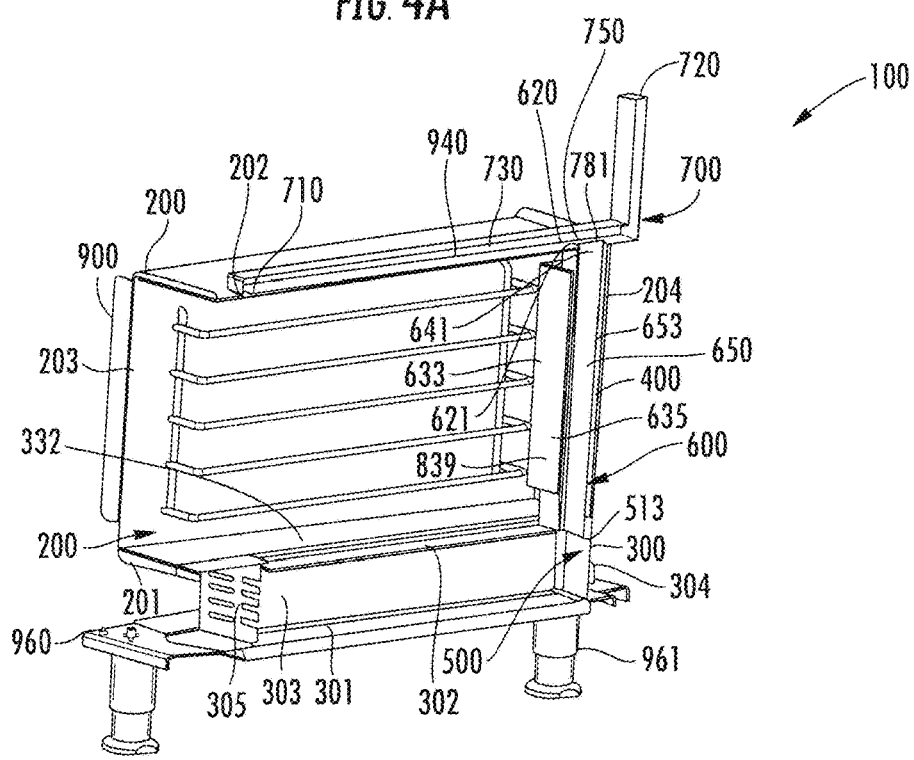
Figure 4C:
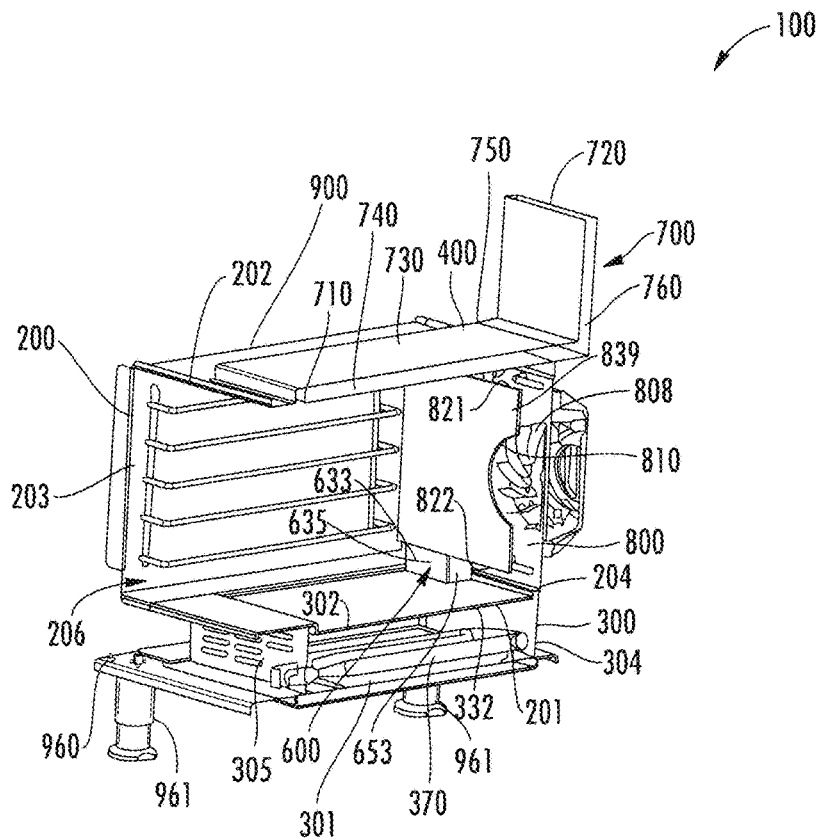
Figure 5A:
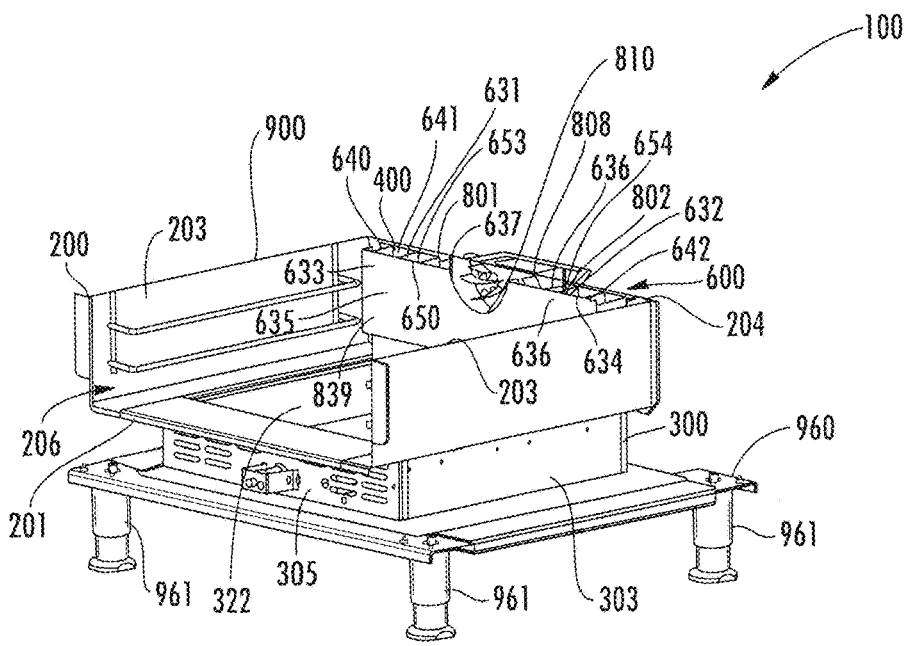
FIGS. 5A & 5B are cross-sectional views in perspective of the oven illustrated in FIGS. 3A-3C taken along sectional lines 5A-5A and 5B-5B, respectively, of FIG. 3A according to various embodiments of the oven system described herein.
Figure 5B:
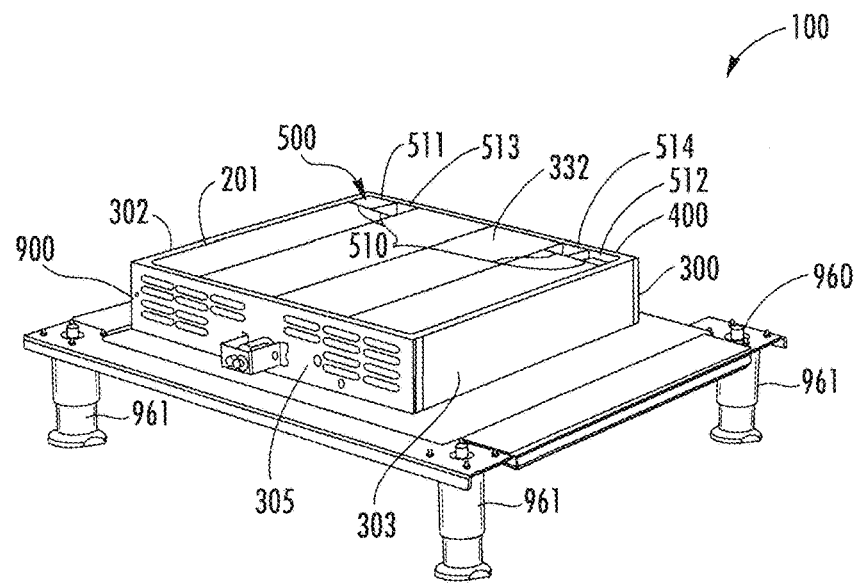

As most clearly shown in the views of FIGS. 4C & 5A, each of the bypass ducts 653, 654 further include a shared wall 637, 638 with the sub-chamber 800, which may comprise a thermally conductive material. The heat conducted and radiated from the shared wall 637, 638 may further indirectly heat gas within the interior space 806 of the sub-chamber 800 and hence the interior space 206 of the cooking chamber 200 via convection. Shared walls 637, 638 extend along the lateral sides defining the interior space 806 of the sub-chamber and may also include all or a portion of a wall defining a pocket 801, 802 (FIG. 5A) between the rear wall 204 of the cooking chamber 200 and bypass ducts 653, 654. The sub-chamber 800, routing ducts 641, 642, and bypass ducts 653, 654 further share an additional wall 839. In the illustrated embodiment, the shared wall 839 includes a plate positioned between the respective interior spaces 206, 806 of the cooking chamber 200 and the sub-chamber 800 and further forming a portion of the shared walls 633, 634, 635, 636 between the interior space 206 of the cooking chamber 200 and routing ducts 641, 642 and bypass ducts 653, 654. The shared wall 839 may be formed of a thermally conductive material to receive heat from the routing ducts 641, 642 and bypass ducts 653, 654 and further heat the interior space 206 of the cooking chamber 200. Thus, the interior space 206 of the cooking chamber 200 may be heated by conduction and radiation from the combustion chamber 300, by convection from the hot combustion gas 1180a that enters via the cooking chamber routing duct 640, by conduction and radiation from the shared walls 633, 634, 635, 636, 839 of the routing ducts 641, 642, bypass ducts 653, 654, and sub-chamber 800, and by conduction and radiation from the shared wall 637, 638 within the sub-chamber 800 which further heats the gas within the interior space 806 of the sub-chamber and thereafter heats the interior space 206 of the cooking chamber 200 by convection from the heated fluid recirculated into the interior space 206.

Figure 6:
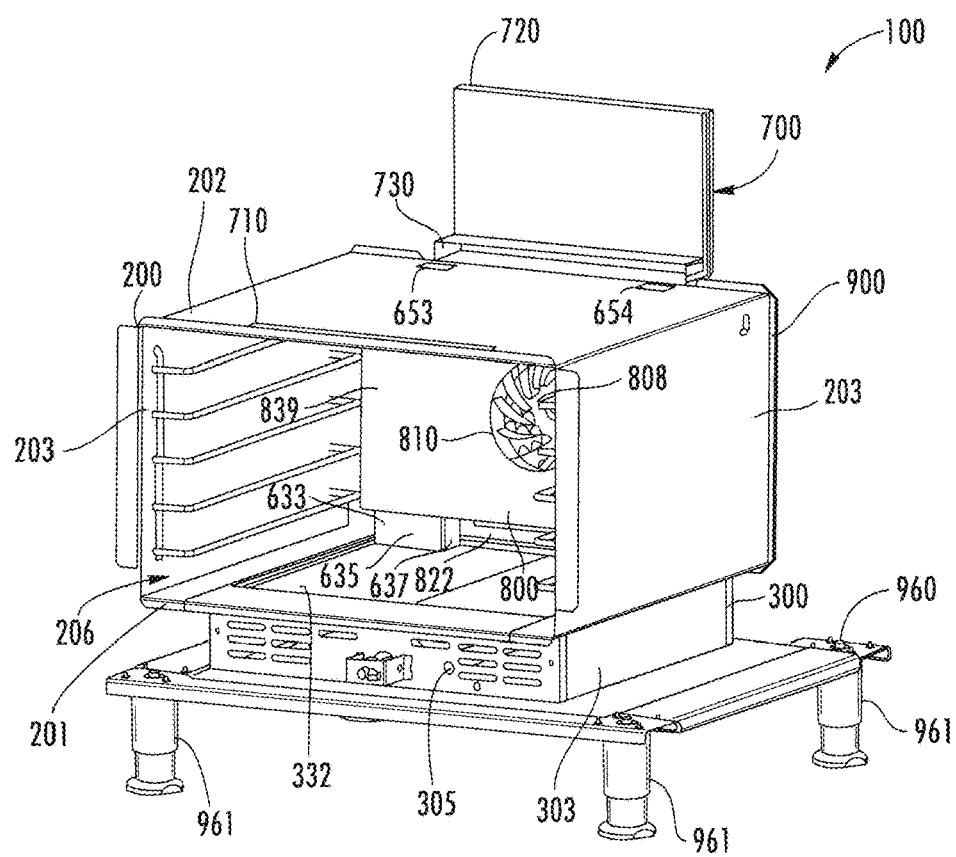
FIG. 6 is an isomeric view of the oven illustrated in FIGS. 3A-3C with a portion of the exhaust duct removed according to various embodiments of the oven system described herein.
Figure 7:
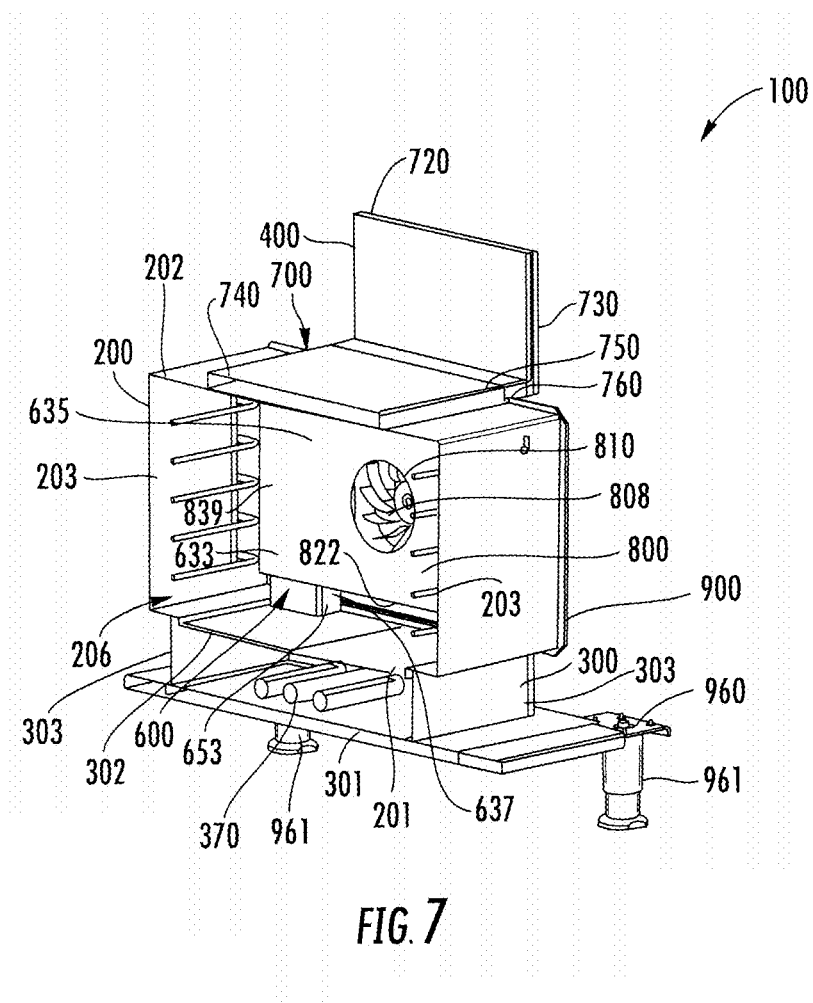
FIG. 7 is a cross-sectional view in perspective of the oven illustrated in FIGS. 3A-3C taken along sectional line 7-7 of FIG. 3A according to various embodiments of the oven system described herein.

The exhaust duct 730 of the exhaust portion 700 includes a cooking chamber exhaust duct 740 positioned to receive the first portion 1180a of combustion gas from the cooking chamber 200 via a cooking chamber exhaust port 710. As best shown in the view of FIG. 4C, the cooking chamber exhaust duct 740 is in at least partial fluid communication with the cooking chamber 200 via the cooking chamber exhaust port 710 and with the flue exhaust port 720. The cooking chamber exhaust port 710 is disposed along the top wall 202 of the cooking chamber 200 such that the first portion 1180a of the combustion gas within the cooking chamber 200 flows along the top wall 202 to the cooking chamber exhaust port 710. The cooking chamber exhaust port 710 includes a laterally extending opening 711 defined through the top wall 202 of the cooking chamber 200 (see FIG. 6, illustrating the oven 900 with the cooking chamber exhaust duct 740 removed). As best shown in the views of FIGS. 4C & 7, the cooking chamber exhaust duct 740 is disposed along a top portion of the cooking chamber 200, adjacent to the top wall 202 of the cooking chamber 200. The top wall 202 of the cooking chamber 200 and the cooking chamber exhaust duct 740 comprise a shared wall 732. The cooking chamber exhaust duct 740 extends to a cooking chamber bypass exhaust duct 750 positioned to receive the second portion 1180b of the combustion gas from the cooking chamber bypass duct 650. In operation, the cooking chamber exhaust duct 740 extends adjacent to the cooking chamber 200 such that the first portion 1180a of the combustion gas flowing therein may transfer heat to the shared wall 732 to indirectly heat or assist in the retention of heat in the adjacent cooking chamber 200. For example, the first portion 1180a of the combustion gas may flow along the top wall 302 to the cooking chamber 200 thereby heating the interior space 206 by convection while also heating the top wall 202. The first portion 1180a of the combustion gas may then flow through the cooking chamber exhaust port 710 into the cooking chamber exhaust duct 740 to continue to transfer heat to the shared wall 732 or provide a thermal barrier to heat loss from the shared wall 732 within the exhaust duct 740 to indirectly heat the adjacent cooking chamber 200. The cooking chamber exhaust duct 740 is dimensioned to have an increased surface area along the shared wall 732. In various embodiments, the surface area of the shared wall 732 may comprise less than, equal to, or greater than half of the corresponding surface of the top wall 202 defining the interior space 206. As illustrated, the surface area of the shared wall 732 encompasses greater than half of the corresponding surface of the top wall 202 defining the interior space 206. In one embodiment, the surface area of the shared wall 732 may encompass all or substantially all top wall 202 defining the interior space 206. Thus, the interior space 206 of the cooking chamber 200 may be heated by conduction and radiation from the combustion chamber 300, by convection from the hot combustion gas 1180a that enters via the cooking chamber routing duct 640, by conduction and radiation from the shared walls 633, 634, 635, 636, 637, 638, 839, 732 as well as by convection from the heated fluid recirculated into the interior space 206 by the fan 808.

As best shown in the view of FIGS. 3A & 4B, the cooking chamber bypass exhaust duct 750 is positioned along a common exhaust duct 760 that is positioned to receive the first portion 1180a of the combustion gas from the cooking chamber exhaust duct 740 and the second portion 1180b of the combustion gas from the cooking chamber bypass duct 650. The common exhaust duct 760 extends vertically from the cooking chamber exhaust duct 740 and directs the combined combustion gas 1180 to the flue exhaust port 720, which in this embodiment, comprises a common flue exhaust port 720. The common exhaust duct 760 further includes a horizontal component and extends horizontally along a same plane as the cooking chamber exhaust duct 740 and beyond the rear of the combustion chamber 300 and cooking chamber 200.

Various dimensions are described herein in non-limiting examples to assist the reader in understanding the various beneficial aspects. Those having skill in the art will appreciate upon reading the present disclosure that various dimensions, angles, proportions, etc. may be increased or decreased without departing from the various beneficial aspects. Similarly, ratios may be determined from the dimensions provided in the examples, any of which are to be considered specifically identified herein, and may similarly be appropriately increased or decreased without departing from the beneficial aspects described herein.

This disclosure describes various elements, features, aspects, and advantages of various embodiments, configurations, and arrangements of the oven systems, apparatuses, and methods thereof. It is to be understood that certain descriptions of the various embodiments and such configurations and arrangements thereof have been simplified to illustrate only those elements, features and aspects that are relevant to a more clear understanding of the disclosed embodiments, while eliminating, for purposes of brevity or clarity, other elements, features and aspects. Any references to "various," "certain," "some," "one," or "an" when followed by "embodiment," "configuration," or "arrangement" generally means that a particular element, feature and/or aspect described in the example is included in at least one embodiment. The phrases "in various," "in certain," "in some," "in one," or "in an" when followed by "embodiment", "configuration", or "arrangement" may not necessarily refer to the same embodiment. Furthermore, the phrases "in one such" or "in this" when followed by "embodiment," "configuration," or "arrangement," while generally referring to and elaborating upon a preceding embodiment, is not intended to suggest that the elements, features, and aspects of the embodiment introduced by the phrase are limited to the preceding embodiment; rather, the phrase is provided to assist the reader in understanding the various elements, features, and aspects disclosed herein and it is to be understood that those having ordinary skill in the art will recognize that such elements, features, and aspects presented in the introduced embodiment may be applied in combination with other various combinations and sub-combinations of the elements, features, and aspects presented in the disclosed embodiments. It is to be appreciated that persons having ordinary skill in the art, upon considering the descriptions herein, will recognize that various combinations or sub-combinations of the various embodiments and other elements, features, and aspects may be desirable in particular implementations or applications. However, because such other elements, features, and aspects may be readily ascertained by persons having ordinary skill in the art upon considering the description herein, and are not necessary for a complete understanding of the disclosed embodiments, a description of such elements, features, and aspects may not be provided. For example, ovens and oven systems described herein may also include connections such as fittings for one or more of electrical connections, gas connections, or flue connections. As such, it is to be understood that the description set forth herein is merely exemplary and illustrative of the disclosed embodiments and is not intended to limit the scope of the invention as defined solely by the claims.

It will be further appreciated that for conciseness and clarity, spatial or relative terms such as "vertical," "horizontal," "upper," "lower," "lateral," "top," "bottom," "side," "front," "rear," and others may be used herein with respect to the described and illustrated embodiments. However, ovens and oven systems employing ovens may be used in many orientations and positions, and these terms are not intended to be limiting and absolute.

All numerical quantities stated herein are approximate unless stated otherwise, meaning that the term "approximately" may be inferred when not expressly stated. The numerical quantities disclosed herein may be nominal numerical quantities and are to be understood as not being strictly limited to the exact numerical values recited. Instead, unless stated otherwise, each numerical value is intended to mean both the recited value and a functionally equivalent range surrounding that value. All numerical ranges stated herein include all sub-ranges subsumed therein. For example, a range of "1 to 10" is intended to include all sub-ranges between and including the recited minimum value of 1 and the recited maximum value of 10. Any maximum numerical limitation recited herein is intended to include all lower numerical limitations. Any minimum numerical limitation recited herein is intended to include all higher numerical limitations. Additionally, in some illustrative embodiments, dimensions including a parameter, measurement, diversion, or range may be given. It is to be understood that any such parameter, measurement, diversion, or range is provided as an illustrative example or instance of an embodiment and is not intended to limit that or other embodiments. For example, unless otherwise specified, illustrations of dimensions and how such parameters or measurements of such dimensions relate to other parameters, e.g., with respect to movement, support, engagements, interfacing dimensions are provided to aid the reader's understanding of the features and may not be illustrated to scale nor universally applicable to every embodiment.

What is claimed is:

1. An oven system comprising:
 a) a cooking chamber;
 b) a combustion chamber; and
 c) a flue, the flue comprising
   i) a combustion chamber collection portion comprising one or more collection ports positioned to receive combustion gas produced in the combustion chamber,
   ii) a routing portion positioned to receive the combustion gas from the one or more collection ports, the routing portion comprising a cooking chamber routing duct comprising one or more routing ducts positioned to route a first portion of the combustion gas into the cooking chamber and a cooking chamber bypass duct comprising one or more bypass ducts positioned to route a second portion of the combustion gas along a path that bypasses the cooking chamber, and iii) an exhaust portion comprising one or more exhaust ducts positioned to receive the first portion of the combustion gas from the cooking chamber and the second portion of the combustion gas from the one or more bypass ducts, wherein the exhaust portion further comprises one or more exhaust ports to exhaust the first and second portions of the combustion gas from the flue, wherein at least one routing duct extends adjacent to the cooking chamber along a shared wall with the cooking chamber to transfer heat from the first portion of the combustion gas to the shared wall with the cooking chamber.

2. The oven system of claim 1, further comprising a door defining a first wall of the cooking chamber, wherein the cooking chamber routing duct comprises a first routing duct and a second routing duct, wherein the cooking chamber bypass duct comprises a first bypass duct and a second bypass duct, and wherein the first and second routing ducts extend along a second wall of the cooking chamber to transfer heat from the first portion of the combustion gas to the second wall of the cooking chamber and the first and second bypass ducts extend along a third wall of the cooking chamber, different than the second wall, to transfer heat from the second portion of the combustion gas to the third wall of the cooking chamber.

3. The oven system of claim 1, further comprising a door defining a first wall of the cooking chamber, wherein the cooking chamber routing duct comprises a first routing duct and a second routing duct, wherein the cooking chamber bypass duct comprises a first bypass duct and a second bypass duct, and wherein the first and second routing ducts and the first and second bypass ducts extend along a second wall of the cooking chamber, opposite the first wall, to transfer heat from the first and second portions of the combustion gas to the second wall of the cooking chamber.

4. The oven system of claim 1, wherein at least one routing duct extends adjacent to the cooking chamber along a first shared wall with the cooking chamber to transfer heat from the first portion of the combustion gas to the first shared wall of the cooking chamber, wherein at least one bypass duct extends adjacent to the cooking chamber along a second shared wall with the cooking chamber to transfer heat from the second portion of the combustion gas to the second shared wall of the cooking chamber, and wherein at least one exhaust duct comprises a cooking chamber exhaust duct to receive the first portion of the combustion gas from the cooking chamber and direct the flow of the first portion of the combustion gas along a third shared wall with the cooking chamber to transfer heat from the first portion of the combustion gas received from the cooking chamber to the third shared wall of the cooking chamber.

5. The oven system of claim 4, wherein the first and second shared walls are disposed along a rear wall of the cooking chamber, and wherein the third shared wall is disposed along a top wall of the cooking chamber.

6. The oven system of claim 5, further comprising a sub-chamber disposed within the cooking chamber, wherein the sub-chamber houses a convection fan operable to pull gas from the cooking chamber into the sub-chamber through one or more first openings and to expel the gas pulled into the sub-chamber back into the cooking chamber through one or more second openings, and wherein at least one bypass duct extends adjacent to the sub-chamber along a fourth shared wall with the sub-chamber to transfer heat from the second portion of the combustion gas to the fourth shared wall with the sub-chamber.

7. The oven system of claim 6, wherein the sub-chamber is disposed along a rear portion of the cooking chamber and is defined between a top wall, a bottom wall, a rear wall, a front wall, and a first and a second side wall, wherein the fourth shared wall comprises a fifth shared wall and a sixth shared wall, wherein the first side wall comprises the fifth shared wall and the second side wall comprises the sixth shared wall.

8. The oven system of claim 1, further comprising a sub-chamber disposed within the cooking chamber, wherein the sub-chamber houses a convection fan operable to pull gas from the cooking chamber into the sub-chamber through one or more first openings and to expel the gas pulled into the sub-chamber back into the cooking chamber through one or more second openings.

9. The oven system of claim 8, wherein at least one bypass duct extends adjacent to the sub-chamber along a shared wall with the sub-chamber to transfer heat from the second portion of the combustion gas to the shared wall with the sub-chamber.

10. The oven system of claim 9, wherein the sub-chamber is disposed along a rear portion of the cooking chamber and is defined between a top wall, a bottom wall, a rear wall, a front wall, and a first and a second side wall, wherein at least one first bypass duct extends adjacent to the first side wall along a shared wall with the first side wall to transfer heat from the second portion of the combustion gas to the shared wall with the first side wall, and wherein at least one second bypass duct extends adjacent to the second side wall along another shared wall with the second side wall to transfer heat from the second portion of the combustion gas to the shared wall with the second side wall.

11. The oven system of claim 1, wherein at least one exhaust port comprises a cooking chamber exhaust port in a top wall of the cooking chamber, wherein at least one exhaust duct comprises a cooking chamber exhaust duct extending above the top wall and comprising a shared wall with the top wall, wherein the cooking chamber exhaust duct is in fluid communication with the cooking chamber through the cooking chamber exhaust port to receive the first portion of the combustion gas from the cooking chamber and direct the flow of the first portion of the combustion gas along the shared wall.

12. The oven system of claim 11, wherein the wall shared by the top wall and the cooking chamber exhaust duct comprises at least half of the surface area of the top wall.

13. The oven system of claim 1, wherein the exhaust portion is configured to exhaust the first and second portions of the combustion gas from the flue into a common external environment.

14. The oven system of claim 1, wherein the exhaust portion fluidically couples the cooking chamber and one or more of the bypass ducts to recombine at least a portion of the first and second portions of the combustion gas when exhausted therethrough.

15. An oven system comprising:
a) a cooking chamber;
b) a combustion chamber; and
c) a flue, the flue comprising
 i) a combustion chamber collection portion comprising one or more collection ports positioned to receive combustion gas produced in the combustion chamber,
 ii) a routing portion positioned to receive the combustion gas from the one or more collection ports, the routing portion comprising a cooking chamber routing duct comprising one or more routing ducts positioned to route a first portion of the combustion gas into the cooking chamber and a cooking chamber bypass duct comprising one or more bypass ducts positioned to route a second portion of the combustion gas along a path that bypasses the cooking chamber, and iii) an exhaust portion comprising one or more exhaust ducts positioned to receive the first portion of the combustion gas from the cooking chamber and the second portion of the combustion gas from the one or more bypass ducts, wherein the exhaust portion further comprises one or more exhaust ports to exhaust the first and second portions of the combustion gas from the flue, wherein at least one bypass duct extends adjacent to the cooking chamber along a shared wall with the cooking chamber to transfer heat from the second portion of the combustion gas to the shared with the cooking chamber.

16. The oven system of claim 15, further comprising a door defining a first wall of the cooking chamber, wherein the cooking chamber routing duct comprises a first routing duct and a second routing duct, wherein the cooking chamber bypass duct comprises a first bypass duct and a second bypass duct, and wherein the first and second routing ducts extend along a second wall of the cooking chamber to transfer heat from the first portion of the combustion gas to the second wall of the cooking chamber and the first and second bypass ducts extend along a third wall of the cooking chamber, different than the second wall, to transfer heat from the second portion of the combustion gas to the third wall of the cooking chamber.

17. The oven system of claim 15, further comprising a door defining a first wall of the cooking chamber, wherein the cooking chamber routing duct comprises a first routing duct and a second routing duct, wherein the cooking chamber bypass duct comprises a first bypass duct and a second bypass duct, and wherein the first and second routing ducts and the first and second bypass ducts extend along a second wall of the cooking chamber, opposite the first wall, to transfer heat from the first and second portions of the combustion gas to the second wall of the cooking chamber.

18. The oven system of claim 15, wherein at least one routing duct extends adjacent to the cooking chamber along a first shared wall with the cooking chamber to transfer heat from the first portion of the combustion gas to the first shared wall of the cooking chamber, wherein at least one bypass duct extends adjacent to the cooking chamber along a second shared wall with the cooking chamber to transfer heat from the second portion of the combustion gas to the second shared wall of the cooking chamber, and wherein at least one exhaust duct comprises a cooking chamber exhaust duct to receive the first portion of the combustion gas from the cooking chamber and direct the flow of the first portion of the combustion gas along a third shared wall with the cooking chamber to transfer heat from the first portion of the combustion gas received from the cooking chamber to the third shared wall of the cooking chamber.

19. An oven system comprising:
a) a cooking chamber;
b) a combustion chamber; and
c) a flue, the flue comprising
i) a combustion chamber collection portion comprising one or more collection ports positioned to receive combustion gas produced in the combustion chamber, ii) a routing portion positioned to receive the combustion gas from the one or more collection ports, the routing portion comprising a cooking chamber routing duct comprising one or more routing ducts positioned to route a first portion of the combustion gas into the cooking chamber and a cooking chamber bypass duct comprising one or more bypass ducts positioned to route a second portion of the combustion gas along a path that bypasses the cooking chamber, and iii) an exhaust portion comprising one or more exhaust ducts positioned to receive the first portion of the combustion gas from the cooking chamber and the second portion of the combustion gas from the one or more bypass ducts, wherein the exhaust portion further comprises one or more exhaust ports to exhaust the first and second portions of the combustion gas from the flue, wherein at least one exhaust duct comprises a cooking chamber exhaust duct to receive the first portion of the combustion gas from the cooking chamber and direct the flow of the first portion of the combustion gas adjacent to the cooking chamber along a shared wall with the cooking chamber to transfer heat from the first portion of the combustion gas received from the cooking chamber to the shared with the cooking chamber.

20. The oven system of claim 19, further comprising a door defining a first wall of the cooking chamber, wherein the cooking chamber routing duct comprises a first routing duct and a second routing duct, wherein the cooking chamber bypass duct comprises a first bypass duct and a second bypass duct, and wherein the first and second routing ducts extend along a second wall of the cooking chamber to transfer heat from the first portion of the combustion gas to the second wall of the cooking chamber and the first and second bypass ducts extend along a third wall of the cooking chamber, different than the second wall, to transfer heat from the second portion of the combustion gas to the third wall of the cooking chamber.

21. The oven system of claim 19, further comprising a door defining a first wall of the cooking chamber, wherein the cooking chamber routing duct comprises a first routing duct and a second routing duct, wherein the cooking chamber bypass duct comprises a first bypass duct and a second bypass duct, and wherein the first and second routing ducts and the first and second bypass ducts extend along a second wall of the cooking chamber, opposite the first wall, to transfer heat from the first and second portions of the combustion gas to the second wall of the cooking chamber.

22. The oven system of claim 19, wherein at least one routing duct extends adjacent to the cooking chamber along a first shared wall with the cooking chamber to transfer heat from the first portion of the combustion gas to the first shared wall of the cooking chamber, wherein at least one bypass duct extends adjacent to the cooking chamber along a second shared wall with the cooking chamber to transfer heat from the second portion of the combustion gas to the second shared wall of the cooking chamber, and wherein at least one exhaust duct comprises a cooking chamber exhaust duct to receive the first portion of the combustion gas from the cooking chamber and direct the flow of the first portion of the combustion gas along a third shared wall with the cooking chamber to transfer heat from the first portion of the combustion gas received from the cooking chamber to the third shared wall of the cooking chamber.

23. A method of assembling an oven, the method comprising:
- a) positioning a cooking chamber above a top wall of a combustion chamber;
- b) positioning one or more first collection ports along the top wall of the combustion chamber to receive a first portion of combustion gas produced in the combustion chamber;
- c) positioning one or more second collection ports along the top wall of the combustion chamber to receive a second portion of combustion gas produced in the combustion chamber;
- e) fluidically coupling one or more cooking chamber routing ducts between the one or more first collection ports and one or more delivery ports opening into the cooking chamber, wherein the one or more cooking chamber routing ducts is operative to receive the first portion of the combustion gas from the one or more first collection ports;
- f) fluidically coupling one or more exhaust ducts of an exhaust portion to exhaust the first and second portions of the combustion gas comprising
  - i) fluidically coupling one or more of the exhaust ducts to one or more cooking chamber exhaust ports extending through a top wall of the cooking chamber; and
  - ii) fluidically coupling one or more cooking chamber bypass ducts between the one or more second collection ports and one or more of the exhaust ducts, wherein the one or more cooking chamber bypass ducts is operative to receive the second portion of the combustion gas from the one or more second collection ports; and
- g) positioning at least one routing duct adjacent to the cooking chamber to form a shared wall with the cooking chamber to transfer heat from the first portion of the combustion gas to the shared wall of the cooking chamber.

24. The method of claim 23, further comprising positioning at least one bypass duct adjacent to the cooking chamber to form a shared wall with the cooking chamber to transfer heat from the second portion of the combustion gas to the shared wall of the cooking chamber.

25. The method of claim 23, further comprising positioning at least one cooking chamber exhaust duct adjacent to the top wall of the cooking chamber to form a shared wall with the cooking chamber to transfer heat from the first portion of the combustion gas received from the cooking chamber to the shared wall of the cooking chamber.

26. The method of claim 23, further comprising positioning a sub-chamber within the cooking chamber and positioning a first bypass duct adjacent to a first side of the sub-chamber and a second bypass duct adjacent to a second side of the sub-chamber to form respective first and second shared walls with the sub-chamber to transfer heat from the second portion of the combustion gas to the first and second shared wall of the sub-chamber, wherein the sub-chamber houses a convection fan operable recirculate fluid contents of the cooking chamber by pulling gas from the cooking chamber into the sub-chamber through one or more first openings and expelling the gas pulled into the sub-chamber back into the cooking chamber through one or more second openings.

27. The method of claim 23, wherein the exhaust portion is configured to exhaust the first and second portions of the combustion gas from the flue into a common external environment.

28. The method of claim 23, wherein the exhaust portion fluidically couples the cooking chamber and one or more of the bypass ducts to recombine at least a portion of the first and second portions of the combustion gas when exhausted therethrough.

* * * * *